(12) United States Patent
Xiong et al.

(10) Patent No.: US 12,175,751 B2
(45) Date of Patent: *Dec. 24, 2024

(54) VIDEO GROUP CLASSIFICATION USING OBJECT TRACKER

(71) Applicant: Western Digital Technologies, Inc., San Jose, CA (US)

(72) Inventors: Shaomin Xiong, Newark, CA (US); Toshiki Hirano, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 357 days.

This patent is subject to a terminal disclaimer.

(21) Appl. No.: 17/729,729

(22) Filed: Apr. 26, 2022

(65) Prior Publication Data

US 2023/0343094 A1   Oct. 26, 2023

(51) Int. Cl.
 *G06V 20/40*   (2022.01)
 *G06T 7/80*    (2017.01)
 *G06V 10/764*  (2022.01)
 *G06V 40/16*   (2022.01)

(52) U.S. Cl.
 CPC .......... *G06V 20/41* (2022.01); *G06T 7/80* (2017.01); *G06V 10/764* (2022.01); *G06V 20/46* (2022.01); *G06V 40/172* (2022.01)

(58) Field of Classification Search
 CPC ...... G06V 20/41; G06V 20/46; G06V 40/172; G06V 10/764; G06T 7/80
 See application file for complete search history.

(56) References Cited

U.S. PATENT DOCUMENTS

| | | | | |
|---|---|---|---|---|
| 8,384,791 B2* | 2/2013 | Porter | ............... | H04N 23/675 |
| | | | | 348/222.1 |
| 8,599,266 B2* | 12/2013 | Trivedi | .................. | G06T 7/292 |
| | | | | 348/169 |
| 9,430,697 B1* | 8/2016 | Iliadis | .................. | G06V 40/172 |
| 11,763,564 B1* | 9/2023 | Sadoughi Nourabadi | .................. | |
| | | | | G06N 20/00 |
| | | | | 386/241 |
| 2013/0148898 A1* | 6/2013 | Mitura | ............... | G06V 10/762 |
| | | | | 382/195 |
| 2016/0163064 A1* | 6/2016 | Ruf | ........................ | G06T 7/20 |
| | | | | 382/103 |
| 2018/0349732 A1* | 12/2018 | Park | ...................... | G06N 20/00 |
| 2019/0034734 A1* | 1/2019 | Yen | ..................... | G06F 18/2413 |
| 2019/0304102 A1* | 10/2019 | Chen | ..................... | G06N 20/00 |
| 2020/0210706 A1* | 7/2020 | Barzelay | ................ | G06V 20/41 |

(Continued)

*Primary Examiner* — Vu Le
*Assistant Examiner* — Jack Peter Kraynak
(74) *Attorney, Agent, or Firm* — Patent Law Works LLP

(57) ABSTRACT

Systems, methods, and data storage devices using a video group classifier based on an object tracker are described. A group classifier may be trained using machine learning to classify image objects from a video frame and assign a classifier identifier. An object tracker and the group classifier may be used to determine correspondence between tracker identifiers and classifier identifiers for assigning group identifiers. The object tracker may then be used to determine image objects, assign tracker identifiers, and track the movement of those image objects through a video data stream to associate tracker identifiers with the video frames. The tracker identifier may be used to assign a group identifier to each video frame based the correspondence between the tracker identifier and the classifier identifier.

20 Claims, 12 Drawing Sheets

(56) References Cited

U.S. PATENT DOCUMENTS

| | | | | |
|---|---|---|---|---|
| 2020/0364263 A1* | 11/2020 | Zadeh | ........................ | G06F 3/00 |
| 2022/0004574 A1* | 1/2022 | Figov | ..................... | G11B 27/28 |
| 2022/0050998 A1* | 2/2022 | Kim | ........................ | G06N 20/00 |
| 2022/0092320 A1* | 3/2022 | Brouns | ................... | G06F 18/23 |
| 2022/0327826 A1* | 10/2022 | Chaterji | ................. | G06V 10/82 |
| 2023/0196831 A1 | 6/2023 | Xiong | | |

\* cited by examiner

VIDEO GROUP CLASSIFICATION USING OBJECT TRACKER

TECHNICAL FIELD

The present disclosure generally relates to video classification and management for end user devices and, more particularly, to using a combination of object trackers and group classifiers to classify image objects in video frames.

BACKGROUND

Data storage devices, such as disk drives (solid-state drives, hard disk drives, hybrid drives, tape drives, etc.), universal serial bus (USB) flash drives, secure digital (SD) cards and SD extended capacity (SDXC) cards, and other form factors, may be used for storing data on behalf of an end user, edge, or host device. These storage devices may include integrated storage devices built into the enclosure of the end user device, removable storage devices mating with the host device through a physical interface connector (directly or through an interface cable), and network storage devices communicating with the end user device using network protocols over a wired or wireless network connection. Some removable storage devices and/or network storage devices may use short range wireless communication, such as Bluetooth, ultra-wideband (UWB), Wi-Fi, Zigbee, etc., for communication with a host device or network. Storage devices may be integrated into storage systems that vary from single storage devices directly supporting an end user device through a peripheral storage interface to multi-device storage systems (often supporting multiple host systems) that include multiple storage devices arranged in an array of drives interconnected by a common communication fabric and, in many cases, controlled by a storage controller, redundant array of independent disks (RAID) controller, or general controller, for coordinating storage and system activities across the array of drives.

End user devices, such as smartphones, tablets, digital cameras, personal computers, and similar devices, are increasingly used to capture and store image data, such as digital photographs and video files, in increasingly large volumes. The end user devices may include one or more image management applications configured to index the photos and videos stored in the data storage device (or devices) associated with the end user device. These image management applications may allow the user to organize, tag, edit, navigate, and display photos and videos in various ways. Image management applications and/or image and video files themselves may include a variety of image metadata describing each image, such as time and location data, image format specifications, edit/correction data, and/or image tags assigned by the user or one or more other applications.

There is a desire to automate the identification and grouping of subject matter within a given pool of images, such as the collection of photos and videos stored in an end user device or its associated storage devices. Increasingly, machine learning may be applied to process a volume of photos and/or video frames, identify objects (such as human faces), and determine similarity factors among those objects for grouping. These groupings may then be tagged automatically or with the assistance of a user to identify the object. Due to the processing requirements to train and execute machine learning algorithms for object detection and classification, these operations may commonly be executed in a server environment based on storing the collection of photos or videos to a remote storage pool and associated server cluster, such as cloud-based photo storage or social media applications.

However, sending personal photos and videos to cloud-based services may be less convenient, less secure, and less responsive than being able to process image data locally. In particular, moving large video files between end-user devices and cloud-based storage may be undesirable in many situations due to time, connectivity, and bandwidth constraints. Additionally, some users may have privacy concerns with sending personal photos or videos for remote storage and processing.

Classification of objects in video data may present a particular challenge, particularly for end user devices with limited processing resources. In some configurations, each frame of the video data stream may be processed as image data through a classifier to generate group identifiers, but this requires substantial processing resources (e.g., at 60 frames per second, a 10-minute high-definition video is equivalent to processing 36,000 photos). Partial sampling of video frames, random or at intervals, reduces processing costs but with reduced accuracy.

A reliable process for grouping, classifying, and navigating video data in end user devices and/or their corresponding data storage devices may be needed.

SUMMARY

Various aspects for using a machine learning-based grouping classifier combined with an object tracker to determine image objects in a video data stream, particularly use of trained facial image classifiers for selected groups mapped to object tracker identifiers for a particular video, are described.

One general aspect includes a device that includes at least one processor, at least one memory, and a storage medium configured to store user video data. The device also includes an object tracker, stored in the at least one memory for execution by the at least one processor, configured to: determine a first image object in a first frame of a video data stream from the user video data; assign, to the first image object in the first frame, a first tracker identifier; process subsequent frames of the video data stream to track movement of the first image object; and associate each frame of the video data stream corresponding to the movement of the first image object with the first tracker identifier. The device also includes a video group engine, stored in the at least one memory for execution by the at least one processor, configured to assign, based on the first tracker identifier, a first group identifier to a first plurality of frames of the video stream, where the first group identifier corresponds to a first classifier identifier from a group classifier, and the group classifier is trained using machine learning to determine at least one classifier identifier, including the first classifier identifier.

Implementations may include one or more of the following features. The device may include a face detector, stored in the at least one memory for execution by the at least one processor, configured to: process each frame of the video data stream to detect at least one human face; and calculate, for the at least one human face, embeddings quantifying a plurality of features of the at least one human face, where detection of the at least one human face by the face detector initiates the object tracker. The device may include a bonding map, stored in the at least one memory, comprising: a plurality of frame identifiers corresponding to a plurality of frames in the video data stream; and a plurality of group identifiers, including the first group identifier, associated with at least one frame identifier of the plurality of frame identifiers, wherein the plurality of group identifiers are assigned to the plurality of frame identifiers based on a plurality of tracker identifiers from the object tracker. The video group engine may be further configured to process the plurality of frames using the object tracker to determine the plurality of frame identifiers and, for each frame identifier and corresponding tracker identifier: store, in the bonding map, that frame identifier; determine a group identifier from the plurality of group identifiers that corresponds to that corresponding tracker identifier; and store, in the bonding map, the determined group identifier associated with that frame identifier. The video group engine may be further configured to access a bonding key configured to map the plurality of tracker identifiers to the plurality of group identifiers, where determining the group identifier for each corresponding tracker identifier includes using that corresponding tracker identifier to index the corresponding group identifier in the bonding key. The video group engine may be further configured to: determine tracker conditions for initiating the group classifier for a target frame of the plurality of frames; determine, using the group classifier, a group null value corresponding to a detected image object not meeting a classification threshold for groups in the group classifier; evaluate, in the bonding map and following processing the plurality of frames to generate the bonding map, tracker identifiers for frame identifiers of adjacent frames to determine a continuous set of a same tracker identifier value; and assign, to the frame identifier for the target frame, a corresponding group classifier for the same tracker identifier value. The device may include the group classifier, stored in the at least one memory for execution by the at least one processor, configured to: determine embeddings for at least one image object in a target frame of a calibration set of frames from the video data stream; process the embeddings for the at least one image object through at least one set of machine learning parameters, where each set of the at least one set of machine learning parameters is assigned to a different classifier identifier; and determine, based on processing the embeddings for the at least one image object, a first classifier identifier for the at least one image object. The device may include a video calibration engine, stored in the at least one memory for execution by the at least one processor, configured to: determine the calibration set of frames from the video data stream, where the calibration set of frames includes fewer frames than all frames in the video data stream; for each frame in the calibration set of frames, select the target frame from the training set of frames, initiate the object tracker to process the target frame to generate at least one tracker identifier for the target frame, and initiate the group classifier to process the target frame to generate at least one classifier identifier for the target frame; and determine at least one correlation between the at least one tracker identifier and the at least one classifier identifier, where assigning, based on the first tracker identifier, the first group identifier to the first plurality of frames of the video data stream is based on the at least one correlation. The object tracker may be further configured to determine at least one tracker confidence parameter for the at least one tracker identifier corresponding to the target frame. The group classifier may be further configured to determine at least one classifier confidence parameter for the first classifier identifier corresponding to the target frame. The video calibration engine may be further configured to: determine at least one tracker threshold; determine at least one classifier threshold; map, for each target frame, the at least one tracker identifier to the at least one classifier identifier; and execute a voting function to determine a set of valid correlations between the at least one tracker identifier and the at least one classifier identifier to determine the at least one correlation, where the voting function is based on evaluating the at least one tracker confidence parameter based on the at least one tracker threshold and evaluating the at least one classifier confidence parameter based on the at least one classifier threshold. The video calibration engine may be further configured to determine the calibration set of frames from the video data stream by: determining a calibration threshold of a number of frames with correlations between the at least one tracker identifier and the at least one classifier identifier; determining, using the object tracker, at least one unique tracker identifier in the video data stream; and sequentially selecting, until the calibration threshold is reached for each unique tracker identifier of the at least one unique tracker identifier, frames from the video data stream to include in the calibration set of frames. The video calibration engine may be further configured to: determine, for each frame in the calibration set of frames, at least one initial tracker identifier; determine, for each frame in the calibration set of frames, at least one initial classifier identifier; modify, for selected frames and to determine the at least one correlation, at least one of: the at least one initial tracker identifier responsive to tracker correction logic; and the at least one initial classifier identifier responsive to classifier correction logic; and determine, based on the at least one correlation, a bonding key may include a plurality of different tracker identifiers from the calibration set of frames and corresponding group identifiers.

Another general aspect includes a computer-implemented method that includes: determining, using an object tracker, a first image object in a first frame of a video data stream from user video data; assigning, by the object tracker and to the first image object in the first frame, a first tracker identifier; processing, by the object tracker, subsequent frames of the video data stream to track movement of the first image object; associating, by the object tracker, each frame of the video data stream corresponding to the movement of the first image object with the first tracker identifier; and assigning, based on the first tracker identifier, a first group identifier to a first plurality of frames of the video stream, where the first group identifier corresponds to a first classifier identifier from a group classifier and the group classifier is trained using machine learning to determine at least one classifier identifier, including the first classifier identifier.

Implementations may include one or more of the following features. The computer-implemented method may include: processing each frame of the video data stream to detect at least one human face; and calculating, for the at least one human face, embeddings quantifying a plurality of features of the at least one human face, where detection of the at least one human face initiates the object tracker. The computer-implemented method may include: determining a plurality of frame identifiers for a plurality of frames in the video data stream; processing the plurality of frames using the object tracker to determine a plurality of tracker identifiers; and, for each frame identifier and corresponding tracker identifier, storing, in a bonding map, that frame identifier, determining, from a plurality of group identifiers, a group identifier that corresponds to that corresponding tracker identifier, and storing, in the bonding map, the determined group identifier associated with that frame identifier. The computer-implemented method may include accessing a bonding key configured to map the plurality of tracker identifiers to the plurality of group identifiers, where determining the group identifier for each corresponding tracker identifier includes using that corresponding tracker identifier to index the corresponding group identifier in the bonding key. The computer-implemented method may include: determining tracker conditions for initiating the group classifier for a target frame of the plurality of frames; determine, from the group classifier, a group null value corresponding to a detected image object not meeting a classification threshold for groups in the group classifier; evaluating, in the bonding map and following processing the plurality of frames to generate the bonding map, tracker identifiers for frame identifiers of adjacent frames to determine a continuous set of a same tracker identifier value; and assigning, to the frame identifier for the target frame, a corresponding group classifier for the same tracker identifier value. The computer-implemented method may include: determining a calibration set of frames from the video data stream, where the calibration set of frames includes fewer frames than all frames in the video data stream; for each frame in the calibration set of frames, selecting a target frame from the calibration set of frames, determining embeddings for at least one image object in the target frame, initiating the object tracker to process the target frame to generate at least one tracker identifier for the target frame, and initiating the group classifier to process the target frame to generate at least one classifier identifier for the target frame, where the group classifier is configured to process the embeddings for the at least one image object through at least one set of machine learning parameters and determine, based on processing the embeddings for the at least one image object, at least one category identifier for the at least one image object; and determining at least one correlation between the at least one tracker identifier and the at least one classifier identifier, where assigning, based on the first tracker identifier, the first group identifier to the first plurality of frames of the video data stream is based on the at least one correlation. The computer-implemented method may include: determining at least one tracker threshold; determining at least one classifier threshold; determining, by the object tracker, at least one tracker confidence parameter for the at least one tracker identifier corresponding to the target frame; determining, by the group classifier, at least one classifier confidence parameter for the first classifier identifier corresponding to the target frame; mapping, for each target frame, the at least one tracker identifier to the at least one classifier identifier; and executing a voting function to determine a set of valid correlations between the at least one tracker identifier and the at least one classifier identifier to determine the at least one correlation, where the voting function is based on evaluating the at least one tracker confidence parameter based on the at least one tracker threshold and evaluating the at least one classifier confidence parameter based on the at least one classifier threshold. Determining the calibration set of frames from the video data stream may include: determining a calibration threshold of a number of frames with correlations between the at least one tracker identifier and the at least one classifier identifier; determining, using the object tracker, at least one unique tracker identifier in the video data stream; and sequentially selecting, until the calibration threshold is reached for each unique tracker identifier of the at least one unique tracker identifier, frames from the video data stream to include in the calibration set of frames. The computer-implemented method may include: determining, for each frame in the calibration set of frames, at least one initial tracker identifier; determining, for each frame in the calibration set of frames, at least one initial classifier identifier; modifying, for selected frames and to determine the at least one correlation, at least one of the at least one initial tracker identifier responsive to tracker correction logic and the at least one initial classifier identifier responsive to classifier correction logic; and determining, based on the at least one correlation, a bonding key may include a plurality of different tracker identifiers from the training set of frames and corresponding group identifiers.

Still another general aspect includes a computing device that includes: at least one processor; at least one memory; a storage medium configured to store user video data; means for determining, using an object tracker, a first image object in a first frame of a video data stream from the user video data; means for assigning, by the object tracker and to the first image object in the first frame, a first tracker identifier; means for processing, by the object tracker, subsequent frames of the video data stream to track movement of the first image object; means for associating, by the object tracker, each frame of the video data stream corresponding to the movement of the first image object with the first tracker identifier; and means for assigning, based on the first tracker identifier, a first group identifier to a first plurality of frames of the video stream, where the first group identifier corresponds to a first classifier identifier from a group classifier and the group classifier is trained using machine learning to determine at least one classifier identifier, including the first classifier identifier. The various embodiments advantageously apply the teachings of data storage devices and/or image management systems to improve the functionality of such computer systems. The various embodiments include operations to overcome or at least reduce the issues previously encountered in image management systems and, accordingly, are more efficient, reliable, and/or secure than other computing systems configured for image management of video data. That is, the various embodiments disclosed herein include hardware and/or software with functionality to improve video grouping and retrieval, such as by using trained, group-specific classifiers in combination with object trackers with mapped correspondence. Accordingly, the embodiments disclosed herein provide various improvements to end user devices and/or image management systems.

It should be understood that language used in the present disclosure has been principally selected for readability and instructional purposes, and not to limit the scope of the subject matter disclosed herein.

DETAILED DESCRIPTION

Figure 1:
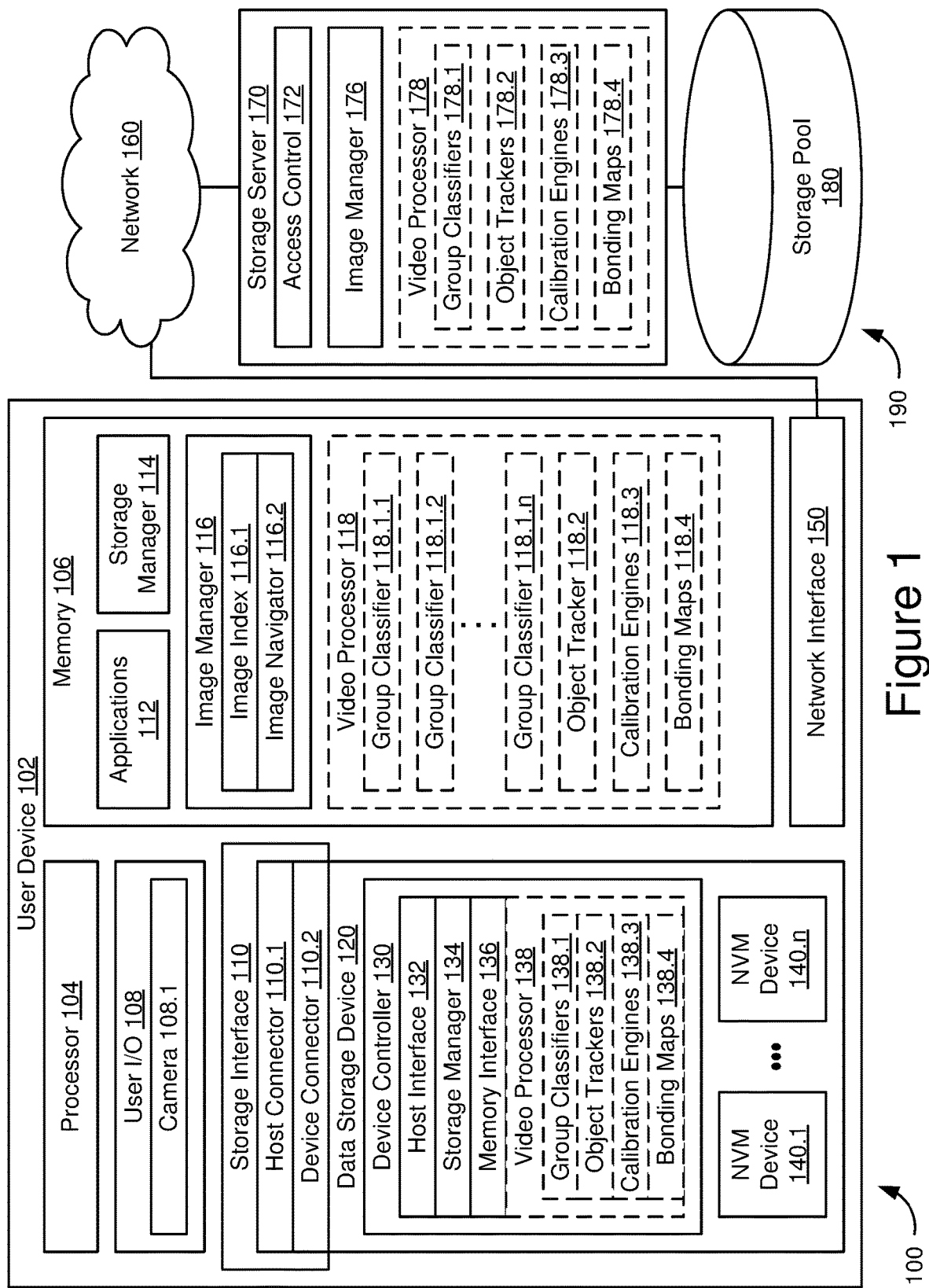
FIG. 1 schematically illustrates an example storage system with an end user device and remote image data storage server.

FIG. 1 shows an embodiment of an example data storage system 100 with an end user device 102 hosting a data storage device 120 configured to store image data, including video data, and classify images in that image data using onboard group classifiers. For example, the trained group classifiers may be used to classify or group objects in the frames of video files and store video grouping information for frames, consecutive blocks of frames, and each video file as a whole to assist with video indexing and navigation. In some embodiments, user device 102 may interface or communicate with a storage server, such as a cloud photo storage or image manager service, over network 160 for one or more functions related to image storage, management, and classification. User device 102 and/or data storage device 120 may connect to network 160 to communicate with network storage system 190 that includes storage server 170 and storage pool 180. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, disk drives, or drives) in communication with user device 102. In some embodiments, user device 102 may be an end user device with an embedded computing system, such as a video camera, mobile phone, tablet computer, smart television, smart appliance, portable game device, printer, or other consumer electronic device. In some embodiments, storage device 120 may be a removable storage device, such as a universal serial bus (USB) flash drive, secure digital (SD) card, extended capacity (SDXC) SD card, or other removable storage device.

In the embodiment shown, storage device 120 is attached to storage interface 110 for host communication with user device 102. For example, user device 102 may include a host connector 110.1, such as a peripheral component interface express (PCIe) connector, USB slot, memory card slot/reader (for Memory Stick, MultiMedia Card, SD, SDXC, etc. memory cards), etc., that provides a physical connector configured to mate with a corresponding storage device connector 110.2. In some embodiments, host connector 110.1 may define a slot or port providing a wired internal connection to a host bus or storage interface controller. In some embodiments, device connector 110.2 may include a portion of a storage device housing or projection therefrom that removably inserts into the slot or port in host connector 110.1 to provide a physical attachment and electrical connection for host-device communication. In some embodiments, an intervening wire, extender, switch, or similar device compatible with host connector 110.1 and device connector 110.2 may be inserted between host connector 110.1 and device connector 110.2 without materially changing the host-device interface or operation of storage interface 110.

In some embodiments, storage interface 110 may be configured to use network communication protocols. Host connector 110.1 and device connector 110.2 may include any type of physical connector compatible with one or more network and/or internet protocols. For example, host connector 110.1 and device connector 110.2 may include ethernet, PCIe, Fibre Channel, small computer serial interface (SCSI), serial attached SCSI (SAS), or another network-capable interface. Storage interface 110 may include or interconnect with a plurality of physical port connections and intermediate components that define physical, transport, and other logical channels for establishing communication with the different components and subcomponents for establishing a communication channel between user device 102 and storage device 120. In some embodiments, storage interface 110 may provide a primary host interface for storage device management and host data transfer, as well as a control interface that includes limited connectivity to the host for low-level control functions, such as through a baseboard management controller (BMC).

In some embodiments, data storage device 120 is, or includes, a solid-state memory device. Data storage device may include a non-volatile memory (NVM) or storage device controller 130 based on compute resources (processor and memory) and a plurality of NVM or media devices 140 for data storage (e.g., one or more NVM device(s), such as one or more flash memory devices). In some embodiments, storage device controller 130 may include a host interface controller 132, a host storage manager 134, and one or more memory interface controllers 136. For example, host interface controller 132 may include a physical subsystem, such as an application specific integrated circuit (ASIC) or system on a chip (SOC), and/or logic or firmware running on the general compute resources of storage device controller 130 for configuring and controlling communication with user device 102 over storage interface 110. Host storage manager 134 may include configuration, background, and storage processing operations running on the general compute resources of storage device controller 130 to coordinate operation of storage device 120, host interface controller 132, and memory interface controller 136. Memory interface controller 136 may include a physical memory bus and related resources for connecting to media devices 140.1-140.$n$, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors, such as device connector 110.2, for interconnecting with storage interface 110.

In some embodiments, data storage device 120 may include a video processor 138 configured to process video data stored in media devices 140 for use and display by user device 102. For example, video processor 138 may be configured to use the processor and memory resources of device controller 130 to classify new video data objects as they are stored to data storage device 120. In some embodiments, video processor 138 may include one or more image group classifiers 138.1 trained to classify images based on the presence of specific objects, such as human faces, and, more specifically, grouping images of the same person or group of people. Video processor 138 may also include one or more object trackers 138.2 trained to track image objects (subsets of image data corresponding to identifiable real-world objects, such as human faces, cars, animals, license plates, etc. and represented by a bounding box or other location information and one or more features). Video processor 138 may be configured to use a combination of group classifiers 138.1 and object trackers 138.2 to classify or group frames based on the identifiable image objects they contain, without using group classifiers 138.1 on every frame. For example, each time a new video data object is received by data storage device 120, it may use calibration engines 138.3 to process a calibration subset of frames from the video data stream through both group classifiers 138.1 and object trackers 138.2 to determine correlations between tracker identifiers and classifier identifiers, then assign corresponding group identifiers to frames containing objects for that group relying primarily on object trackers 138.2. In some embodiments, calibration engines 138.3 may generate bonding keys for each video file, then video processor 138 may process the full video file to generate and store a bonding map 138.4 for all frames including one or more objects of interest. In some embodiments, video processor 138 may be configured with a plurality of image classifiers 138.1 trained for the groups most important to the user of user device 102, where each classifier uses a machine learning-based classifier algorithm with relatively low memory and processor requirements matched to the capabilities of the processor and memory resources of device controller 130. Group classifiers 138.1 may include group classifiers for determining a single group identifier for an image and/or group classifiers for determining a plurality of group identifiers for the image.

In some embodiments, calibration engines 138.3 may include both classifier calibration engines configured to determine the groups for group classifiers 138.1 and train them based on image data in memory devices 140 and video calibration engines configured to determine the bonding key for a particular video file. For example, the classifier calibration engine may be configured to detect an object type, such as human faces, in each image stored in memory devices 140, use a clustering algorithm and selection criteria to determine the highest value image groups, and train a group classifier for each selected group using a subset of images relevant to that group. In some configurations, object detection and related processing may be executed when images are captured, with the object metadata being stored with the image, enabling the classifier calibration engine to use the previously calculated object metadata for the calibration process. In some embodiments, calibration (and recalibration) may be periodic tasks that are triggered when user device 102 and/or data storage device 120 are otherwise idle to allow dedicated use of memory and processor resources of device controller 130. As further described below, in some configurations, video processor 138 and/or select functions thereof may be moved into memory 106 for use of the greater memory and processor (e.g., processor 104) resources of user device 102.

In some embodiments, data storage device 120 may include a single medium device while in other embodiments data storage device 120 includes a plurality of media devices. In some embodiments, media devices 140 may include NAND-type flash memory or NOR-type flash memory. In some embodiments, data storage device 120 may include one or more hard disk drives (HDDs). In some embodiments, data storage device 120 may include a flash memory device, which in turn includes one or more flash memory die, one or more flash memory packages, one or more flash memory channels, or the like. However, in some embodiments, data storage device 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, storage device 120 includes storage device controller 130, which includes one or more processing units (also sometimes called central processing units (CPUs), processors, microprocessors, or microcontrollers) configured to execute instructions in one or more programs. In some embodiments, the one or more processors are shared by one or more components within, and in some cases, beyond the function of the device controller. Media devices 140 may be coupled to device controller 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage device 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations in storage device 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks. In some configurations, logical and/or physical zones may be assigned within storage device 120 as groups of data blocks allocated for specified host data management purposes. Image data objects may include any standardized data structure for organizing and storing digital images in raw, compressed, or vector formats. For example, image data objects may include Joint Photographic Experts Group (JPEG), tagged image file format (TIFF), bitmap (BMP), portable network graphics (PNG), and other standard image formats. In some embodiments, image data objects may include video frames extracted from video data objects, such as Motion Picture Experts Group (MPEG)-4, Windows media video (WMV), QuickTime file format (.MOV), audio video interleave (AVI), and other video format files.

In some embodiments, host, host system, or user device 102 may be coupled to network 160 through a network interface 150. In some embodiments, network 160 may operate over a wired and/or wireless network (e.g., public and/or private computer networks in any number and/or configuration) which may be coupled in a suitable way for transferring data. For example, network 160 may include any means of a conventional data communication network such as a local area network (LAN), a wide area network (WAN), a telephone network, such as the public switched telephone network (PSTN), an intranet, the internet, or any other suitable communication network or combination of communication networks.

User device 102 may be any suitable end-user computer device, such as a personal computer, a laptop computer, a tablet device, a netbook, an internet appliance, a personal digital assistant, a mobile phone, a smart phone, a gaming device, a smart appliance, a camera or video camera, or other consumer electronics device. User device 102 is sometimes called a host, host system, user system, end user device, or end user computing device depending on respective roles, configurations, and contexts. In some embodiments, user device 102 is a consumer electronics device configured to capture and store images, such as an end user computing device with a camera 108.1, such as a smartphone, tablet, digital camera, or digital video camera. In some embodiments, user device 102 may be any computing device configured to store and access data in storage device 120.

User device 102 may include one or more central processing units (CPUs) or processors 104 for executing compute operations or instructions for accessing storage devices 120 through storage interface 110. In some embodiments, processor 104 may be associated with operating memory 106 for executing both storage operations and a storage interface protocol compatible with storage interface 110 and storage device 120. In some embodiments, a separate storage interface unit (not shown) may provide the storage interface protocol and related processor and memory resources. From the perspective of storage device 120, storage interface 110 may be referred to as a host interface and provides a host data path between storage device 120 and user device 102.

User device 102 may include memory 106 configured to support various data access and management functions, generally in support of one or more applications 112. Memory 106 may include a random access memory (RAM) or another type of dynamic storage device that stores information and instructions for execution by processor 104 and/or a read only memory (ROM) or another type of static storage device that stores static information and instructions for use by processor 104 and/or any suitable storage element such as a hard disk or a solid state storage element. For example, memory 106 may include one or more dynamic random access memory (DRAM) devices for use by user device 102 for command, management parameter, and/or host data storage and transfer to and from storage device 120.

User device 102 may include one or more user input/output devices 108, as appropriate to the type of user device 102. In some embodiments, input/output devices 108 may include one or more conventional mechanisms that permit a user to input information to user device 102 such as a keyboard, mouse, pen, touch screen, microphone, accelerometer, biometric mechanisms, haptic interface, etc. In some embodiments, input/output devices 108 may include camera 108.1 comprised of image, infrared, and/or other sensors for capturing image data and converting the image data to one or more image data objects for storage, transmission, display, and other uses. Input/output devices may include one or more conventional mechanisms that output information to the operator, such as a display, printer, speaker, haptic feedback, etc.

In some embodiments, user device 102 may include one or more applications 112 instantiated in user device memory 106 for execution by user device processor 104. Applications 112 may include and/or be configured to access one or more storage management functions of storage manager 114. Storage manager 114 may include applications, services, libraries, and/or corresponding interfaces for managing the contents and operation of storage device 120 on behalf of user device 102. For example, storage manager 114 may include services for monitoring storage device parameters, such as total capacity, capacity used, and capacity available, tracking storage device input/output (I/O) history, performance, and workload, and initiating host storage maintenance functions, such as media scans, defragmentation, host data transfer or reorganization, etc. Image manager 116 may include applications, services, libraries, and/or corresponding interfaces for managing the image data contents of storage device 120 on behalf of user device 102. For example, image manager 116 may include an image index 116.1 configured to identify image data objects and video data objects in storage device 120 and organize corresponding metadata describing the image data objects and video data objects. Image manger 116 may also include an image navigator 116.2 configured to provide user display and navigation of the image data objects and video data objects in image index 116.1, such as a graphical user interface that displays thumbnail images, filenames, descriptions, grouping identifiers, etc. in a hierarchical, tagged, browsable, searchable, or otherwise organized and navigable user display.

In some embodiments, user device 102 may include a video processor 118 configured to process video data objects stored in storage device 120 for indexing, display, and navigation by image manager 116. As described above with regard to video processor 138, video processor 118 may include similarly configured group classifiers 118.1, object trackers 118.2, calibration engines 118.3, and/or resulting bonding maps 118.4 for video data objects. In some embodiments, device controller 130 may not have the necessary memory and/or processor capabilities for some or all functions of video processor 138 and one or more functions may be implemented by user device 102 using processor 104 and memory 106. For example, video processor 118 may include a plurality of image group classifiers 118.1.1-118.1.*n* configured to classify new images in groups 1-n and/or object trackers 118.2. In some embodiments, some image classifiers and/or some image trackers may be implemented in data storage device 120 and other image classifiers and/or image trackers may be implemented using user device 102 memory and processor resources. Similarly, in some embodiments, image processor 118 may include calibration engines 118.3 to obviate the need for calibration engines 138.3, as these may be more resource intensive compute tasks. Bonding maps 118.4 may be generated in video processor 118 and/or video processor 138 and stored with video metadata accessible by image manager 116, regardless of whether that is in memory 106 or data storage device 120.

In some embodiments, network storage system 190 may be a cloud-based storage system supporting one or more data backup, recovery, and/or image management services. For example, storage server 170 may be a cloud server hosting an image data backup, management, and recovery application with a web, mobile application, or similar interface for storing user image data in storage pool 180. In some embodiments, storage pool 180 may be a distributed data storage system configured with redundant data storage devices providing data availability and redundancy to storage server 170. For example, storage pool 180 may include geographically distributed rack storage system configured in RAID groups and clusters for supporting various server-based applications, including storage server 170. In some embodiments, storage server 170 may be configured to receive and store image data objects from storage device 120 based on an image storage configuration defined by image manager 116 and/or a corresponding cloud-based image manager 176. In some embodiments, storage server 170 may include access control 172 for receiving user credentials, such as username, password, and security certificates, for establishing secure image data transfer between data storage device 120 and storage server 170 and otherwise providing the functions of image manager 176 over network 160.

In some embodiments, image data from data storage device 120 may be stored, through image manager 176, to storage pool 180 and enable some functions of video processors 118 and 138 to be hosted remotely on storage server 170 as video processor 178. For example, due to the higher memory and processing requirements of the calibration stage, calibration engines 178.3 may instantiated in storage server 170. In some embodiments, calibration engine 178.3 may generate group classifiers 178.1 and deploy them over network 160 to user device 102 and/or storage device 120 as group classifiers 118.1 and/or group classifiers 138.1. Similarly, calibration engines 178.3 may generate bonding keys and deploy them over network 160 to user device 102 and/or storage device 120. In such configuration, object trackers 178.2 may be used solely by calibration engines 178.3, with object trackers 118.2 and/or object trackers 138.2 performing the grouping of the video frames in user device 102 and/or data storage device 120. In some embodiments, bonding maps 178.4 for some or all video files may be generated in storage server 170 and deployed to user device 102 and/or data storage device 120 for use by image manager 116. In some embodiments, a user may configure some or all image data, including video data, to not be transmitted over network 160 or stored remotely in storage pool 180 and may require that all image processor functions be executed locally by video processor 118 and/or video processor 138.

Figure 2:
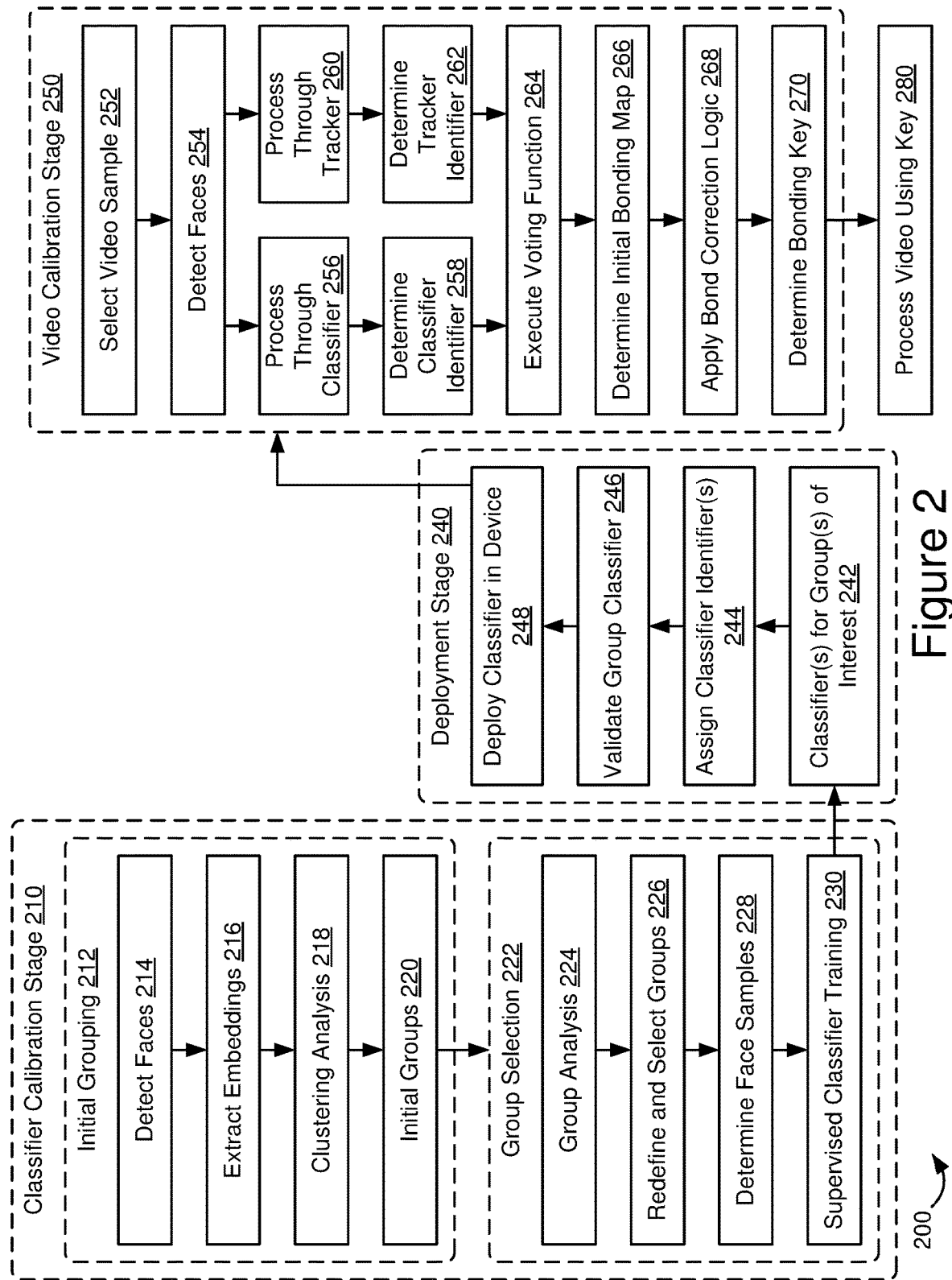
FIG. 2 schematically illustrates an example method of calibrating and deploying image group classifiers and using those image group classifiers for processing video data.

FIG. 2 shows a schematic representation of a method 200 for calibrating and deploying image group classifiers and then using the image group classifiers to process video files. For example, method 200 may be executed using storage system 100 of FIG. 1. In some embodiments, method 200 may proceed according to a plurality of stages. For example, a classifier calibration stage 210 may be used to generate one or more image group classifiers based on an existing collection of images, such as the images currently stored in a storage device. A deployment stage 240 may assign the selected group classifiers to a run-time environment in the end user device. A video calibration stage 250 may use the trained group classifiers with object trackers to generate a bonding key for new video data. An operating stage (i.e., block 280) may use the bonding key, as well as the object trackers and, in some cases, the group classifiers, to process all frames in the video data stream, as described further with regard to FIGS. 7 and 8.

In some embodiments, method 200 may be used for clustering and organizing personal photographs and videos, such as images of family and friends captured by and stored on a mobile phone. For such applications, the exact number of relevant groups may be different from user to user, but may generally be limited to a relatively small number of frequently occurring people and social groups (e.g., household, co-workers, extended family, sports team, book club, etc.) of interest. It may be preferable to execute some or all stages of method 200 locally on the end user device or even based solely on the resources of the data storage device storing the images. Local processing may improve efficiency, reduce bandwidth usage (and enable offline use), improve data security, and prevent sensitive information (e.g., private images, biometric information, etc.) from being transferred over public networks, such as the internet. There may also be configurations where cloud-based resources or another edge device (e.g., personal computer) are also used, such as in conjunction with cloud-based backup and photo management apps. Data processing may include various filtering steps that may be inserted for classifier calibration stage 210, video calibration stage 250, and/or operating stage 280 to reduce the number of images to be processed at each stage and improve image quality and/or other image characteristics to improve performance of the various machine learning algorithms and resulting models. To reduce the processing requirements for video grouping, video calibration stage 250 may operate on a reduced subset of frames from a particular video data object to generate a corresponding bonding key and the bonding key will enable processing the remainder of the video frames with reduced processing requirements (due to no or limited use of the group classifiers for the remaining frames). In some configurations, user input may be used at various stages to assist with selection, identification, and prioritization of groups and/or image content or features for making grouping and ranking decisions. Similarly, image groups, image group classifiers, grouping decisions, and ranking decisions may be validated to enable tuning and retraining as needed. In some embodiments, object locations, embeddings, confidence scores, and other metadata generated through the various stages may be stored for reuse by later stages and/or some tuning and retraining operations.

Calibration stage 210 may include two distinct steps or sub-stages for generating image group classifiers. Calibration stage 210 may include an initial grouping sub-stage 212 for determining a number of initial clusters present in the set of images and a group selection sub-stage 222 for selecting and training the image group classifiers of interest.

At block 214, initial grouping sub-stage 212 may begin with detecting faces (or other target objects) in each image in the set of images targeted for calibration. For example, an object detector may be configured for detecting and bounding each human face within an image based on a machine learning algorithm previously trained for human face detection. In some device configurations, face detection may be executed when images are captured and related object metadata, such as the face bounding box, may be stored in image metadata for the image. In some embodiments, calibration may use the previously generated object metadata, rather than running a separate face detection during calibration. At block 216, embeddings, such as facial feature vectors, may be extracted from each detected human face.

For example, a previously trained embedding model for facial recognition may be used to extract a set of feature vectors quantifying various facial features and (distance/position) relationships among them for each detected face in the images. In some embodiments, an available face detection algorithm and embedding model, such as FaceNet, ArcFace, RetinaFace, MobileFaceNet, etc. may be used. The size, complexity, and processing resource requirements of the face detection algorithm may be governed by the location of the processing. For example, a lightweight model may be used for edge devices, such as a data storage device or end user device, and heavier weight models may be reserved for cloud or server-based calibration operations. In some embodiments, object position (face box), embeddings, and confidence scores may be stored as extended metadata data for each image data object corresponding to the processed images.

At block 218, clustering analysis may be performed on the images and, more specifically, the embeddings from the faces detected in each image. For example, a clustering algorithm may be run against the subset of images that include detected faces and may cluster images based on single faces and/or groups of faces in the same image. In some embodiments, an unsupervised clustering method, such as density-based spatial clustering of applications with noise (DBSCAN), Chinese whispers, or another graph-based clustering algorithm and corresponding thresholds for identifying and ranking clusters. For example, each detected face may be treated as a node and similarity of embeddings and/or other metadata may be treated as links, resulting in clusters among detected faces with the most similar embeddings and/or other metadata. In some embodiments, sets of detected faces in images may also be used for clustering social groups. At block 220, a set of initial groups may be determined from the set of images processed at block 214. For example, clustering analysis 220 may include statistical thresholds for determining clusters representing a reoccurring face and/or social group with a desired level of statistical significance and minimum threshold number of nodes (images). In some configurations, each group may include a single person and the clustering algorithm may determine multiple groups including the same person. The initial groupings may be passed to group selection sub-stage 222.

At block 224, group selection sub-stage 222 may begin with group analysis of the initial groupings from initial grouping sub-stage 212. For example, a set of group selection criteria may be applied to the initial groupings and related metrics to determine the most relevant groups from among the initial groups. Group analysis may be based on metadata generated by detection and clustering in initial grouping sub-stage 212 and/or other image metadata generated as part of the image capture and management processes prior calibration stage 210. For example, group analysis may use face counts, creation time, geo-location, storage location (e.g., folder structures or other organization information related to image file management), image source tags, content tags, and cluster size to determine a plurality of metrics (sums, averages, modes, greatest/least values, etc.) related to the metadata parameters for each initial group and the images in that cluster. In some embodiments, group analysis may include generation of additional analytics for each initial group and/or among groups. For example, relationship links among initial groups may be determined using graph-based relationship algorithms to determine which faces and corresponding groups in the same image are linked, compute group distance and similarity between/among groups, and/or otherwise quantify the relationships among the initial groups. In some embodiments, user inputs may be received to assist in group analysis. For example, users may be provided with an interface that displays one or more images from a group and allows the user to tag the group with a name, relationship (child, parent, friend, etc.), social group (family, work, soccer team, etc.), priority, and/or other metadata tags to assist in group selection.

At block 226, the initial groups may be redefined and selected for generation of a group image classifier. For example, the static metadata, metrics, relationship values, and user tags determined at block 224 may be used as parameters for evaluating a plurality of selection rules. In some embodiments, group selection thresholds may be configured for one or more rules to enable selection of groups with counts, distributions, relationships, or other metrics meeting the selection threshold. In some embodiments, one or more group parameters may be used to rank the groups, such that higher values (e.g., counts or relationship ranking values) may place the initial groups in an order and a number of groups may be selected (e.g., top 3 groups, top 10 groups, top 5 groups in different categories, etc.). Thresholds and ranks may also be used to eliminate groups, such as eliminating or consolidating groups with high similarity that are likely to be the same person or group. User tags received at block 224 may be used for group selection by allowing the user to give priority to particular groups, relationships, or other group tag information that is used in the selection rules at block 226. For example, the user may specifically tag individual groups with selection priority or define classes of tags (e.g., family relationships) that may override other group selection criteria. In some embodiments, group analysis and selection may be executed automatically based on a set of group selection rules, with or without manual intervention or validation by a user.

At block 228, face samples may be determined for training an image group classifier for each selected group. For example, some or all of the images identified in each initial group may be selected to use for training, depending on the number of images in the corresponding group set. In some embodiments, training images may be filtered or ranked and only a subset of images for each selected group may be selected. For example, a target range of images may be determined for the training data set, such as 1-1000 faces/images per group. Images may be filtered based on one or more characteristics, such as the source or resolution of the image, size of the face bounding box, face angle (preferring front/mug shot angle), full set of face landmarks/feature vectors (no face coverings or occlusions), and/or other metadata characteristics.

At block 230, a machine learning-based classifier algorithm is selected and trained using the images selected at block 228 for each group selected at block 226. For example, an image classifier based on a machine learning algorithm (including neural network models), such as support vector machine (SVM), naive Bayes, or K-nearest neighbours (KNN) algorithms targeting the embeddings and/or other metadata related to the face images in the set of training images for the group. In some embodiments, the image classifier may be configured as a single group or binary classifier that returns a single group identifier for images meeting the classification criteria of that image classifier. In some embodiments, the image classifier may be configured as a multigroup classifier capable of determining whether multiple groups are present and returning an appropriate set of group classifiers. In some embodiments, classifier training may be monitored and verified during the training process based on one or more training metrics and related thresholds. The output of block 230 and calibration stage 210 may be a plurality of image classifiers for deployment stage 240, where each image classifier is specifically trained for identifying a face or group of faces (social group) of interest in existing or new images.

At block 242, at least one image classifier corresponding to a group of interest to the user of an end user device has been generated. At block 244, each image classifier may be assigned a unique classifier identifier and/or a group classifier handling multiple groups may be assigned classifier identifiers for each group it handles. For example, an arbitrary unique identifier, such as a sequential group number, may be generated and used to track initial groups through the calibration process, assigned as groups are selected, and/or assigned to the trained classifier. Each classifier identifier may uniquely correspond to a group of interest and, therefore, may also be or indicate a corresponding group identifier. In a multigroup classifier configuration, a group classifier may correspond to multiple groups (or individuals) of interest and be configured to return an array of group identifiers and/or confidence values associated with each group identifier. For example, a multigroup group classifier may classify a face in an image as belonging to group 1, group 2, or group 3. In another example, an image containing multiple faces may allow the multigroup group classifier to identify faces belonging to group 1 and group 2. A multigroup group classifier may return multiple tag values (e.g., classifier identifiers) and/or multiple confidence scores (which may be associated directly with a tag value or translated to a tag value based on value position and/or a confidence threshold). In some embodiments, a group classifier may be configured to return a group null value or a "group 0" value for one or more faces that are detected as faces, but not recognized by the group classifier (or set of group classifiers). In some embodiments, the unique classifier identifier and/or group identifier may include or be associated with one or more user tags, such as image tags provided during calibration stage 210, to enable more user-friendly management of image classifiers.

At block 246, each image classifier may be validated. For example, the group classifier may be used to process the images originally provided in classifier calibration stage 210, such as the images from the original face detection at block 214. In some embodiments, validation may use the embeddings extracted at block 216 to avoid additional (redundant) processing overhead and the resulting classifications may be compared to corresponding images in an initial group that was used to generate the image classifier. For example, the degree of overlap between the initial group and the output of the trained image classifier may be compared to an overlap threshold to validate the image classifier. In some embodiments, a set of validation rules may be applied, such as using multiple faces in one image to confirm different individuals or using the same face in similar locations in adjacent frames of a video clip or photo burst (series of photos taken in quick succession). In some embodiments, manual validation, such as showing images having varying confidence levels to a user to have them indicate whether the same person or group is present in each image may be used to validate the performance of the group classifier. At block 248, the image classifiers may be deployed to the end user device for use in classifying current and/or future images stored in the end user device, including video content. For example, each image classifier may be stored in an image processor in the user device or an associated data storage device to classify images on those devices during subsequent operations.

In some configurations, group classifiers deployed in deployment stage 240 may be used for classification of video data in addition to classifying still images stored on the end-user device. While group classifiers could be used to classify each frame of a video data object independently, such frame-by-frame grouping may require an inordinate amount of processing time and resources. Additionally, video frame images may have wildly varying image quality that may make operation of classifiers inconsistent, resulting in higher grouping error rates than many collections of still images. Still further, processing each frame separately does not take advantage of information from adjacent frames that may be useful in correctly grouping the content in a series of adjacent frames.

Video calibration stage 250 may be executed for each video data object, such as video data files, to determine a bonding key for use in processing each frame of that video data object. The bonding key may include correspondence information to associate tracker identifiers from an object tracker (that can be used to process the entire video) with classifier identifiers from the set of group classifiers deployed to the user device. For example, a smartphone, tablet, or digital camera may store a number of image group classifiers selected for relevance to the user of that device in calibration stage 210 and use the image group classifiers to determine a bonding key for each video captured or received by the device. At block 252, a video sample from a target video data object may be selected for use in video calibration stage 250. For example, a new video may be received by the user device and a video processor may select a subset of frames from the video to use for the calibration process. At block 254, faces may be detected in the sample frames using a face detector. For example, the user device may be equipped with a face detection algorithm, which may be similar to the detection algorithm used in blocks 214 and 216, that processes the selected video frames as images and extracts embeddings for detected face image objects.

At block 256, the embeddings may be processed through the image group classifiers (and/or one or more multigroup group classifiers that handles multiple group identifiers). At block 260, one or more group identifiers may be determined for each frame. For example, the image group classifier may receive the embeddings for each frame with a detected face and output one or more classifier identifiers and corresponding classifier confidence scores for the detected faces in that frame. Each group classifier may have a corresponding group classification threshold based on the confidence score returned by that group classifier and images with confidence scores meeting the group classification threshold may be assigned to that group, such as by associated the class identifier with the image as a metadata tag or entry in a metadata table. In some embodiments, video calibration stage 250 may also include monitoring a number of faces not assigned group identifiers, which may be represented by a null value from the group classifiers. The number of unknown faces may be compared to an unknown face count threshold for determining when calibration stage 210 is re-run to determine whether new group classifiers are needed.

At block 260, the embeddings may also be processed through an object tracker configured to track the same object type (e.g., human faces) as targeted by the group classifier. For example, an object tracking algorithm, such as a multi-domain convolutional neural network tracker (MDNet), generic object tracking using regression networks (GOTURN), recurrent you-only-look-once (ROLO), etc., may be configured to assign unique tracker identifiers to detected objects (such as based on an initial bounding box from block 254) and track their locations from frame-to-frame. The object tracker may be configured to model both the future position of an object (reducing search space) and the visual appearance of the object (embeddings) looking for intersections of unity (IOU) between adjacent frames. At block 262, tracker identifiers may be determined for each frame. For example, the object tracker may track a number of objects across the frames of the calibration set of video frames and provide the corresponding tracker identifiers for the objects being tracked (and present) in any given frame. The object tracker may also generate tracker confidence scores and/or other object tracker parameters related to each tracker identifier and corresponding frames.

At block 264, a voting function may be executed to determine correlations between classifier identifiers and tracker identifiers in the frames of the calibration set. For example, the classifier identifiers from block 258 and tracker identifiers from block 262 may populate a data structure for mapping identifiers associated with the same frame, such as a table including frame identifiers and corresponding classifier identifiers and tracker identifiers. In some embodiments, the voting function may include logic for evaluating confidence thresholds of the classifier identifiers and/or tracker identifiers such that only highly reliable instances of the identifiers are considered correlations. In some embodiments, one or more parameters within the group classifier and/or object tracker may also be tuned to require a high-level of certainty and/or filter out less likely identifications during video calibration stage 250, which may pre-filter the results evaluated by the voting function. At block 266, an initial bonding map 266 is determined based on the voting function. For example, the initial bonding map may include only those correlations between tracker identifiers and classifier identifiers that both have high-levels of confidence in the same frame. At block 268, bond correction logic may be applied to the initial bonding map from block 266. For example, bond correction logic may include both tracker correction logic (based on correlations of classifier identifiers in other frames) and classifier correction logic (based on correlations of tracker identifiers in other frames). The bond correction logic may fill in gaps and inconsistencies and/or eliminate outlier values to generate a calibration bonding map with a set of classifier identifiers and a set of tracker identifiers that have strong correlations. At block 270, a bonding key may be determined. For example, a classifier identifier may be determined for each tracker identifier and the definitive set of correlations may be reduced to the bonding key that determines which tracker identifiers should be mapped to which classifier identifiers for generating group identifiers when the full video is processed.

At block 280, the full video may be processed using the object tracker and the bonding key. For example, the full video data stream (all frames) and/or the remaining set of frames that were not processed during video calibration stage 250 may be processed with the object tracker and the bonding key may be used to map the tracker identifiers generated by the object tracker to the classifier identifiers and corresponding group identifiers in the bonding key. In some embodiments, processing the full video may include a set of tracker conditions that determine whether the bonding key group identifier corresponding to the tracker identifier is used in the full bonding map or, by exception, triggers the frame to be processed through the group classifiers for a directly classifier-based classifier identifier. In some embodiments, whether group classifiers may be used after video calibration stage 250 may a configurable setting and/or based on available time and/or processing resources for the additional classifier processing.

Figure 3:
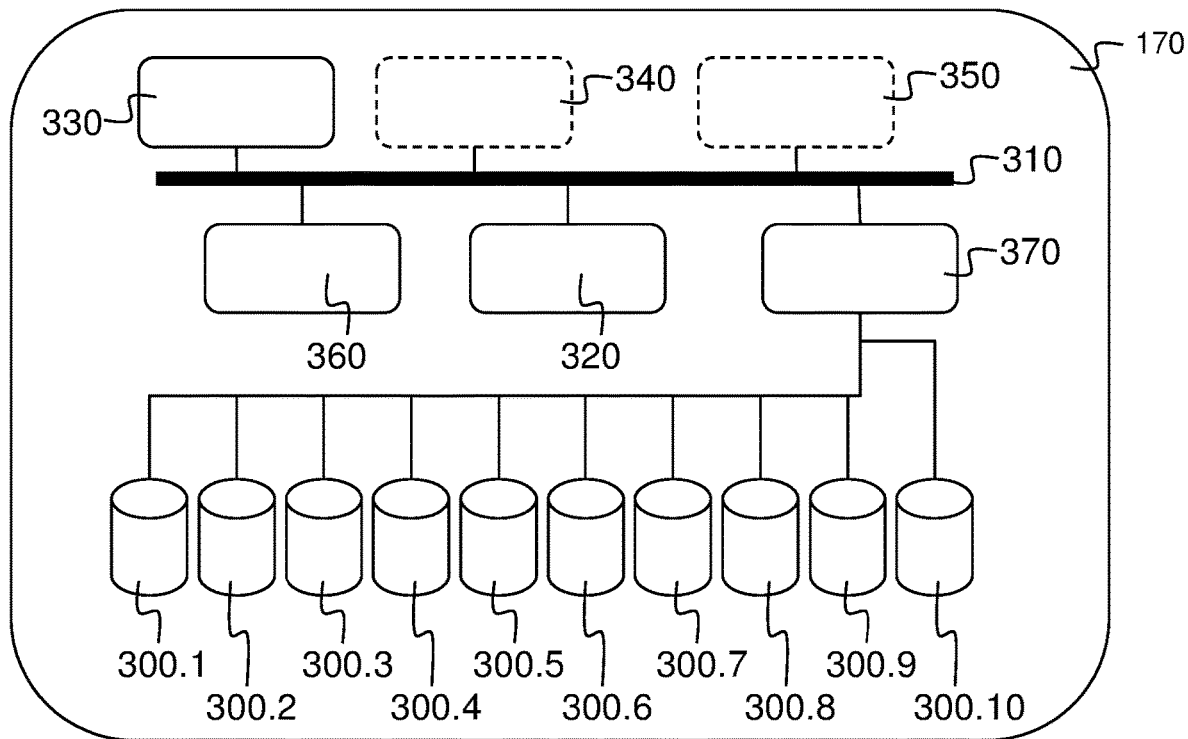
FIG. 3 schematically illustrates a storage server of the storage system of FIGS. 1 and 2.

Image ranking stage 270 may rank, organize, and/or store images assigned to groups for a better FIG. 3 shows a schematic representation of a storage server 170. Storage server 170 may comprise a bus 310, a storage node processor 320, a storage node memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a storage controller, backplane management controller, network interface controller, or host bus interface controller. Bus 310 may include one or more conductors that permit communication among the components of storage server 170. Processor 320 may include any type of conventional processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 302, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage server 170 to communicate with other devices and/or systems, for example mechanisms for communicating with user device 102 over network 160.

Figure 4:
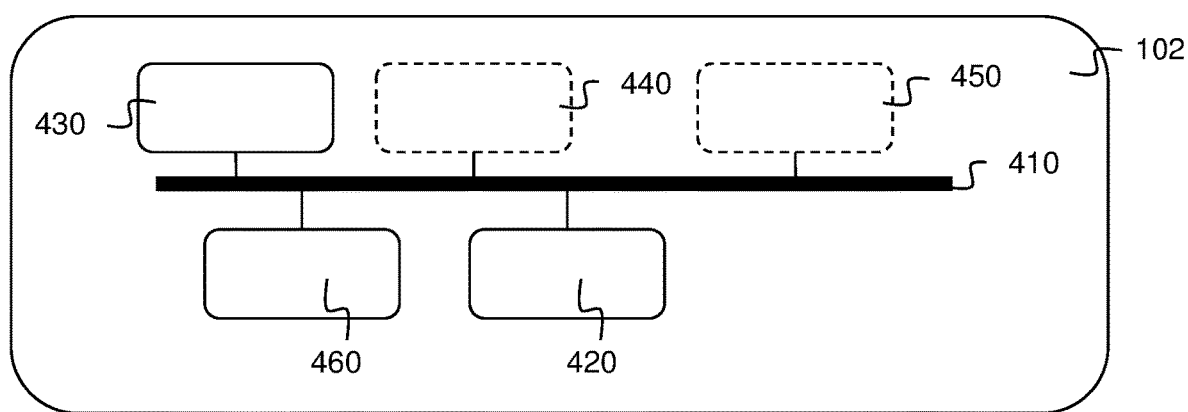
FIG. 4 schematically illustrates an end user device of the storage system of FIGS. 1 and 2.

FIG. 4 shows a schematic representation of an example user device 102. User device 102 may comprise a bus 410, a host processor 420, a host memory 430, one or more optional input units 440, one or more optional output units 450, and a communication interface 460. Bus 410 may include one or more conductors that permit communication among the components of user device 102. Processor 420 may include any type of conventional processor or microprocessor that interprets and executes instructions. Host memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. In some embodiments, host memory 430 may include both operating memory, such as memory 106, and one or more data storage devices accessible over a storage interface, such as data storage device 120. Software instructions may be stored in a combination of operating memory and non-volatile memory and may be loaded from non-volatile memory into operating memory for execution. For example, applications 112, storage manager 114, image manager 116 and/or video processor 118 may be instantiated in instructions, operations, or firmware stored in host memory 430 for execution by host processor 420.

An optional input unit 440 may include one or more conventional mechanisms that permit an operator to input information to user device 102 such as a keyboard, touchscreen, a mouse, a pen, voice recognition and/or biometric mechanisms, etc. In some embodiments, optional input unit 440 may include image, audio, infrared, and/or other sensors for camera or other consumer electronics functions. Optional output unit 450 may include one or more conventional mechanisms that output information to the operator, such as a display, a printer, a speaker, etc. Communication interface 460 may include any transceiver-like mechanism that enables user device 102 to communicate with other devices and/or systems. In some embodiments, communication interface 460 may include one or more peripheral interfaces, such as a PCIe, USB, SD, SDXC, or other interface for connecting to storage device 120 and/or a network interface for communicating with storage device 120 over a fabric network.

Figure 5A:
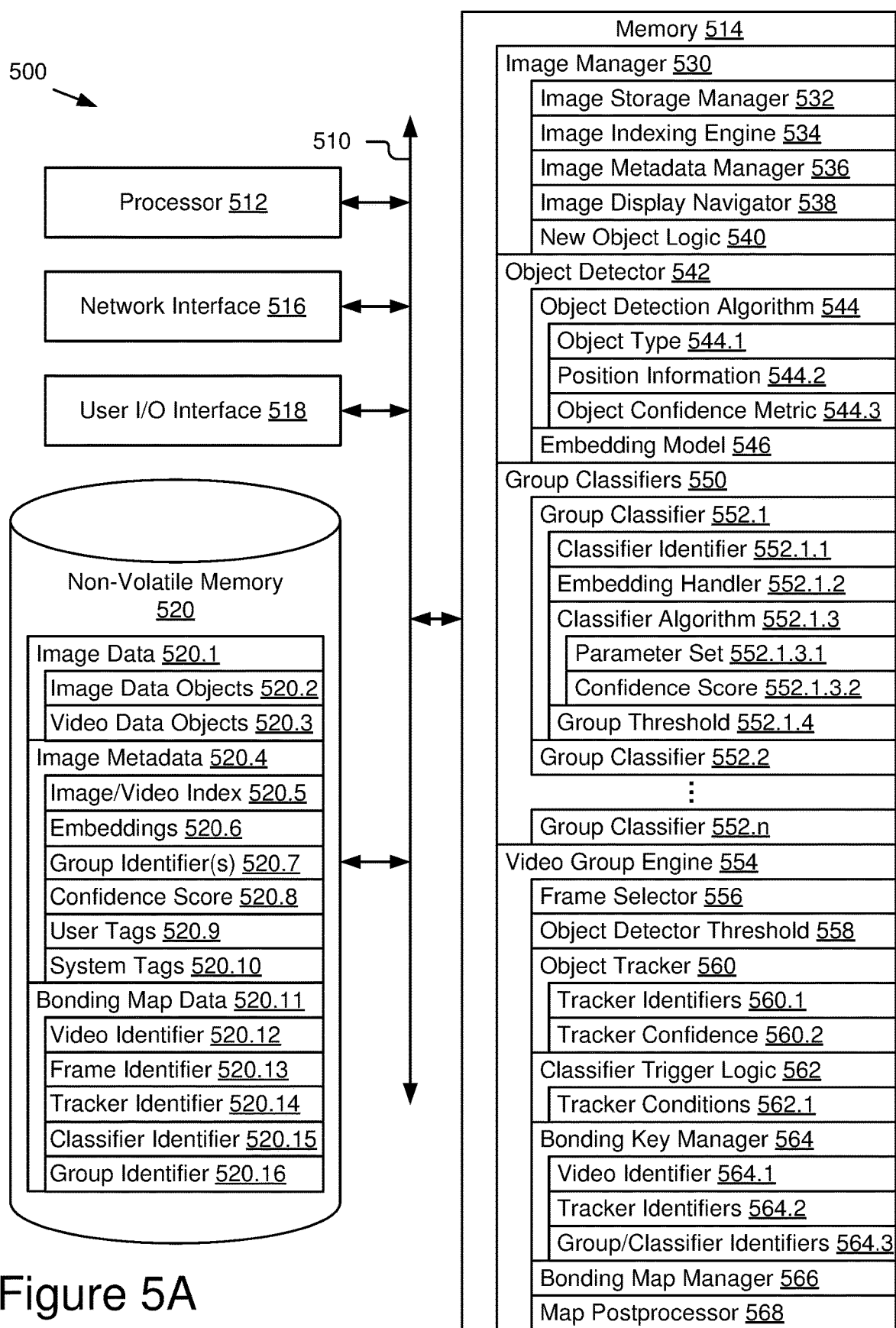
FIGS. 5A, 5B, and 5C schematically illustrates some elements of the storage system of FIGS. 1 and 2 in more detail.
Figure 5B:
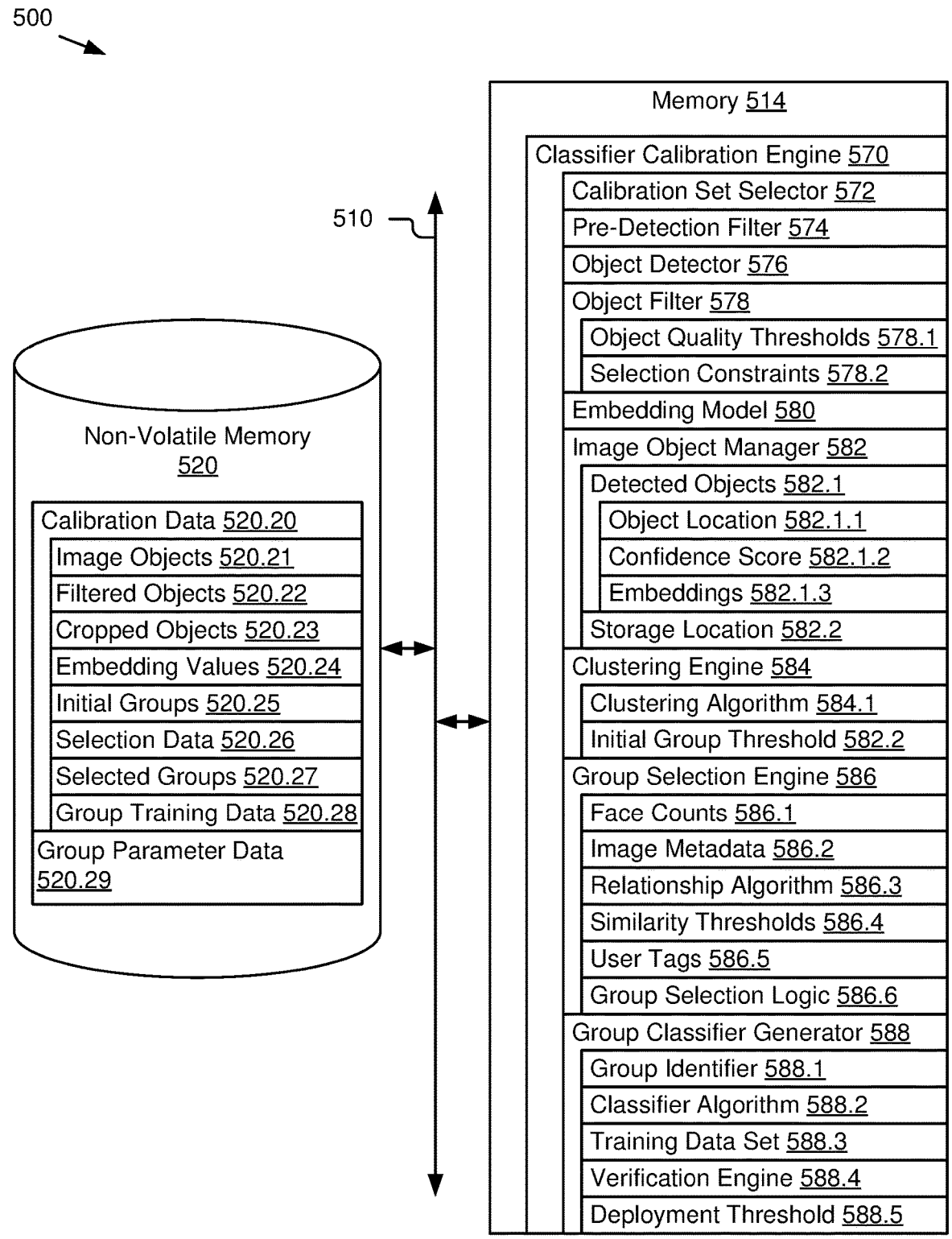
Figure 5C:
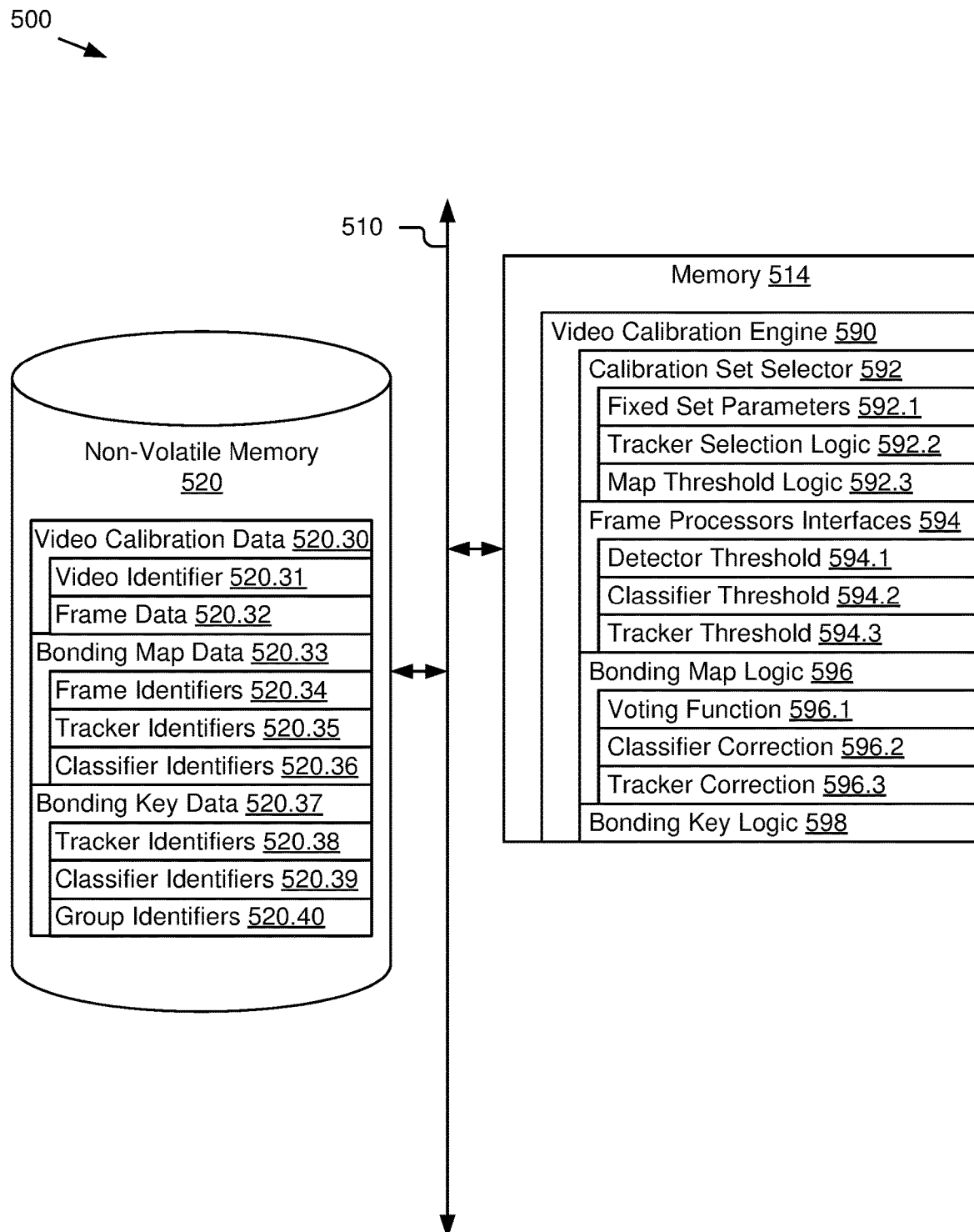

FIGS. 5A, 5B, and 5C schematically show selected modules of a user device 500 configured for using specifically trained image group classifiers to classify images captured, received, and/or stored by the user device. User device 500 may incorporate elements and configurations similar to those shown in FIGS. 1-2 and 4. For example, user device 500 may include a storage device configured as storage device 120 in storage system 100, where storage device 120 includes object detector 542, group classifiers 550, and video group engine 554, in addition to non-volatile memory 520. In other configurations, processor 512, memory 514, and all modules therein may be system resources of user device 500. In still other configurations, one or more modules from memory 514 and related data from non-volatile memory 520 may be based in a remote storage server 170, such as classifier calibration engine 570 being executed using server resources and deploying group classifiers 550 back to user device 500.

User device 500 may include a bus 510 interconnecting at least one processor 512, at least one memory 514, and at least one interface, such as network interface 516 and user I/O interface 518. Bus 510 may include one or more conductors that permit communication among the components of storage device 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element. Network interface 516 may include a physical interface for wired or wireless communication with a network, such as a local area network (LAN), wide area network (WAN), Converged Network, the internet, etc. User I/O interface 518 may include a physical interface for wired or wireless communication with one or more interface devices, such as input devices or output devices. User I/O interface 518 may include interfaces with I/O devices built into user device 500, such as displays, touchscreens, microphones, cameras, speakers, etc. and/or I/O devices attached through an external interface, such as a USB interface for connecting mouse, keyboard, pen, camera, or other peripherals and/or wired or wireless connections for external displays, speakers, microphones, etc.

User device 500 may include one or more non-volatile memory devices 520 configured to store image data 520.1. For example, non-volatile memory devices 520 may include a plurality of flash memory packages organized as an addressable memory array and/or any data storage device, such as data storage device 120 in FIG. 1. In some embodiments, non-volatile memory devices 520 may include NAND or NOR flash memory devices comprised of single level cells (SLC), multiple level cell (MLC), triple-level cells (TLC), quad-level cells (QLC), penta-level cells (PLC), etc. In some embodiments, non-volatile memory devices 520 may include the storage medium of a storage device, such as NVM devices 140 in storage devices 120.

User device 500 may include a plurality of modules or subsystems that are stored and/or instantiated in memory 514 for execution by processor 512 as instructions or operations. For example, memory 514 may include an image manager 530 configured to receive, index, organize, and enable user interaction with image data objects 520.2 and video data objects 520.3 stored in non-volatile memory 520. Memory 514 may include an object detector 542 configured to detect a predetermined object type in image data objects 520.2. Memory 514 may include at least one group classifier 550 configured to determine whether image data objects 520.2 and/or frames of video data objects 520.3 are assigned to a particular image group based on features of one or more objects detected by object detector 542 and/or video group engine 554. Memory 514 may include a video group engine 554 configured to determine video frames assigned to the same group for use, navigation, and display by image manager 530. Memory 514 may include classifier calibration engine 570 (FIG. 5B) configured to determine, generate, and train group classifiers 550. Memory 514 may include video calibration engine 590 (FIG. 5C) configured to generate bonding keys for video data objects 520.3 that may be used by video group engine 554 to determine bonding map data 520.11 with reduced reliance on processing individual frames through group classifiers 550.

Image manager 530 may include an interface protocol and/or set of functions, parameters, and/or data structures for organizing image data objects 520.2, video data objects 520.3, and related image metadata 520.4 to enable user management, display, navigation, and other uses of image data objects 520.2 and video data objects 520.3. For example, image manager may be an application or service of user device 500 that a user accesses to identify, navigate, and display photos and videos stored on user device 500. In some embodiments, image manager 530 may include a plurality of hardware and/or software modules configured to use processor 512 and memory 514 to handle or manage defined operations of image manager 530. For example, image manager 530 may include an image storage manager 532 configured to receive and store image data objects 520.2 in non-volatile memory 520. Image manager 530 may include an image indexing engine 534 configured to determine all image data objects 520.2 and video data objects 520.3 stored in non-volatile memory 520 and identify their storage locations and various system or object metadata for each. Image manager 530 may include an image metadata manager 536 configured to store image metadata 520.4 in one or more data structures in non-volatile memory 520, such as image metadata tables and/or metadata tags associated with individual images and/or storage locations. Image manager 530 may include an image display navigator 538 configured to provide a graphical user interface for a user to selectively display and navigate between images. Image manager 530 may include new object logic 540 configured to determine how new image data objects 520.2 and/or video data objects 520.3 received or generated by user device 500 are handled.

Image storage manager 532 may include a utility or service that allows image data objects to be stored, retrieved, moved, deleted, etc. in storage locations in non-volatile memory 520. For example, image storage manager 532 may be integrated into a general file manager that enables a variety of file types to be stored and managed within non-volatile memory 520. Image storage manager 532 may include both general file management functions and file management functions that are specific to image and video file types or other image data objects. Image indexing engine 534 may operate in conjunction with image storage manager 532 to determine all image file types stored in non-volatile memory 520. For example, indexing engine 534 may construct an index of files stored in non-volatile memory 520 to assist in retrieval and use of files by other applications. Indexing engine 534 may search for images during initialization, receive notification of image file types when received by image storage manager 532, and/or run periodic indexing searches, such as periodic background scans as processing resources are available. Indexing engine 534 may generate and/or add image/video entries or records to image metadata 520.4 to generate image/video index 520.5. Indexing engine 534 may include storage location, image file type and related information, in image/video index 520.5. Image metadata manager 536 may use image/video index 520.5 to store other metadata in image entries corresponding to a particular image. Image metadata manager 536 may be configured to manage basic system and file metadata (system image tags 520.10) associated with each file and supplement it with metadata generated by other functions or modules, such as object detector 542, group classifiers 550, video group engine 554, classifier calibration engine 570, and/or video calibration engine 590. Image metadata manager 536 may also receive user image tags from image manager 530 and store them in image metadata 520.4 as user image tags 520.9.

Image display navigator 538 may include graphical user interface functions configured to selectively display images and videos to a user through one or more graphical user interface displays associated with user device 500. For example, image display navigator 538 may include the image navigation and display functions of image manager 530. In some embodiments, image display navigator 538 may use image/video index 520.5 and/or other image metadata 520.4 to display listings of image and video files and enable navigation among list, thumbnail, and full image views, as well as enabling image search and/or navigation by storage location, hierarchy, metadata tags, groups, rank orders, navigation history, and other image organization and/or selection paradigms. In some embodiments, image display navigator 538 may access group identifiers 520.7 for displaying selected groups of images, videos, and/or sections of videos corresponding to the groups of interest. Group classifier 550 and/or video group engine 554 may provide group identifiers for new images and/or videos to image manager 530 for storage by image metadata manager 536 and use by image display navigator 538.

Object detector 542 may include an interface protocol and/or set of functions, parameters, and/or data structures configured to detect the presence of one or more objects of a predefined object type in an image. For example, object detector 542 may be configured and trained for a particular object type, such as cars, license plates, packages, animals, human faces, etc. Object detector 542 may be based on an object detection algorithm 544 selected from machine learning-based object detection algorithms and trained with an appropriate training data set for the type of object being detected. For example, a number of human face object detectors are available and may be pre-trained based on large, verified data sets. User device 500 may be configured with one or more object detectors associated with different object types. For example, one object detection algorithm 544 may be selected for a human face object type 544.1 and another object detection algorithm 544 may be selected for a dog object type 544.1. Each object detection algorithm 544 may include a corresponding object type 544.1 and return position information 544.2 and an object confidence metric 544.3 for each instance of the object detected in the image. For example, object detector 542 may use a single pass or double pass method and a trained neural network model to detect any number of objects of object type 544.1 and return a bounding box (or corresponding coordinates) for the object location of each object detected. In some embodiments, position information 544.2 may include position information values, such as the coordinates for a bounding box, in an output array or similar data structure for a plurality of detected objects. For example, object boundary data, such as two horizontal positions and two vertical positions to define a boundary box within the image frame, may be returned with a delimiter between each detected object. If multiple object detectors are operating, position information 544.2 for each object instance of each object type may be determined and corresponding position values returned. In some embodiments, each object detector may return a tag or key-word representing object type 544.1 appended to position information 544.2. Object detector 542 may also return object confidence metric 544.3 for each object detected and corresponding set of position information 544.2 returned. For example, object detector 542 may return an object detected confidence value between 0 and 1 (0-100%), corresponding to a percentage of certainty generated by the machine learning model.

In some embodiments, object detector 542 may include an embedding model configured to extract embedding values quantifying a plurality of features describing the detected object. For example, a human face may be represented by a plurality of feature vectors corresponding to various facial features and their relative sizes, positions, and relationships. In some embodiments, established object detectors may be trained using large, verified data sets that may define a widely used population-based embedding model for quantifying feature vectors according to established standards. This may support use of the resulting embeddings across multiple applications and platforms and embeddings 520.6 may be stored as metadata associated with a particular image and may be transferred with that image. Embedding model 546 may generate a set of embedding values quantifying feature vectors based on a general population standard. In some embodiments, object detector 542 may return the set of embeddings from embedding model 546 associated with each object detected and appended to object type 544.1, position information 544.2, and object confidence metric 544.3.

Group classifiers 550 may include an interface protocol and/or set of functions, parameters, and data structures for classifying an image based on one or more sets of embeddings from object detector 542. For example, each group classifier 552.1-552.n may be configured to determine whether an image containing an object or multiple objects belongs to a particular group of similar images, such as images of the same person or the same group of people. As discussed elsewhere, each group classifier 552.1-552.n may be trained for a specific group that is relevant to the user for automatic discovery and organization of images according to relevant groups. Embeddings from object detector 542 may be processed sequentially (or in parallel if processing resources allow) by each group classifier to determine whether a target image belongs in each group. Images may belong to one group, multiple groups, or no groups. In some embodiments, each group classifier 552 may be configured to return a binary indicator and a group confidence metric. In some embodiments, one or more group classifiers 552 may be configured as multigroup group classifiers and return a plurality of classifier identifiers and/or corresponding group confidence metrics. For example, a multigroup group classifier could be trained to detect the user, the user's spouse, the user's son, and the user's daughter and return confidence values for the presence of each in any given image, as well as combinations, such as the couple (user and user's spouse) or the kids (user's son and user's daughter). Each of these groups may be assigned an integer group identifier value, such as 1 for user, 2 for spouse, 3 for son, 4 for daughter, 5 for couple, and 6 for kids. The multigroup group classifier may also have a return value for other faces that do not correspond to any of the groups, such as a null or 0 value that identifies there are bystanders or unknown people in the image.

Example group classifier 552.1 may be configured with corresponding classifier identifier 552.1.1, embedding handler 552.1.2, classifier algorithm 552.1.3, parameter set 552.1.4, and group threshold 552.1.5. For example, group classifier 552.1 may be configured for a human face object type and trained to assign similar human faces to a group. Group classifier 552.1 may include a classifier identifier 552.1.1 that uniquely identifies the group the classifier is trained to identify. For example, group classifier 552.1 may have been trained to identify the user's spouse and be associated with a classifier or group identifier value of "SPOUSE". Group classifier 552.1 may include an embedding handler 552.1.2 configured to receive a set of embedding values corresponding to a set of feature vectors detected by object detector 542. For example, embedding handler 552.1.2 may receive series of embedding values that map to a predetermined configuration of feature vectors for one or more detected human faces. Group classifier 552.1 may process the set of embedding values for objects in the image using classifier algorithm 552.1.3. Classifier algorithm 552.1.3 may include a machine learning algorithm and corresponding machine learning parameter set 552.1.3.1 generated from a training data set specific to images containing the objects in the group. Selection and training of classifier algorithm 552.1.3 may be further described with regard to calibration engine 570. Classifier algorithm 552.1.3 may be configured to return a group confidence (or probability) score 552.1.3.2 for the image being analyzed. For example, classifier algorithm 552.1.3 may generate a binary value indicating that the objects in the image meet the group criteria (such as 1) or do not meet the group criteria (such as 0) and group confidence score 552.1.3.2 for the binary indicator returned. In another example, classifier algorithm 522.1.3 may generate one or more integer values indicating whether one or more object(s) in the image meet the group criteria for multiple groups (e.g., each integer value may be or map to a group identifier), and may also return corresponding group confidence scores. For example, classifier algorithm 552.1.3 may return a group confidence score between 0 and 1 (0-100%), corresponding to a percentage of certainty generated by the machine learning model. In some embodiments, group classifier 552.1 may include a group threshold 552.1.4 configured to determine whether or not group identifier 552.1.1 is assigned to the image. For example, group threshold 552.1.4 may include a threshold value corresponding to group confidence score 552.1.3.2 and requiring that the confidence score meet or exceed the threshold value to assign the image to the group. Group classifier 552.1 may be configured to return both the binary decision (classifier identifier 552.1.1 to store in group identifier(s) 520.7 for a positive determination) and group confidence score 552.1.3.2 to store in confidence score 520.8.

Video group engine 554 may include an interface protocol and/or set of functions, parameters, and data structures for assigning group identifiers to frames and sequences of frames within a video data object, such as a video file. For example, video group engine 554 may be configured to assign the group identifiers to the majority of or all frames in the video stream based on an object tracker and a bonding key (from video calibration engine 590) that maps tracker identifiers to group identifiers. In some embodiments, video group engine 554 may include a plurality of hardware and/or software modules configured to use processor 512 and memory 514 to handle or manage defined operations of video group engine 554. For example, video group engine 554 may include a frame selector 556 configured to sequentially select video frames from a target video for processing. Video group engine 554 may initiate object detector 542 and include an object detector threshold 558 for initially triggering object tracker 560 to begin processing a sequence of frames. Video group engine 554 may include an object tracker 560 configured to assign tracker identifiers 560.1 and track the movement of image objects across subsequent frames. Video group engine 554 may include classifier trigger logic 562 configured to selectively initiate group classifiers 550 under conditions where object tracker 560 may not accurately support use of bonding keys. Video group engine 554 may include a bonding key manager 564 configured to receive from a bonding key for a target video from video calibration engine 590 for grouping the frames of selected videos based on the tracker identifiers from object tracker 560. Video group engine 554 may include a bonding map manager 566 configured to generate a bonding map for the frames of video data and store the per frame grouping identifiers for use by image manager 530. Image manager 530 may then use the group identifiers associated with the video frames in navigating and displaying videos to the user.

Frame selector 556 may include logic for sequentially processing frames from a target video data object. For example, video group engine 554 may start at an initial frame of a video data stream and sequentially process the frames using the other functions of video group engine 554 and related functions, such as object detector 542 and group classifiers 550. In some embodiments, frame selector 556 may select a frame from the video and initiate object detector 542 to process the frame and determine whether any objects of interest are present. Frame selector 556 may use object detector threshold 558 to evaluate results returned by object detector 542 for a selected frame. For example, if an object of the type of interest is detected and the corresponding object confidence metric 544.3 meets object detector threshold 558, frame selector 556 may pass the frame (and, in some embodiments, data from object detector 542, such as position information and embeddings data) to object tracker 560 to initiate tracking of that object. In some embodiments, object detector 542 may detect multiple objects of interest and frame selector 556 may pass information related to each image object to initiate object tracker 560 to initiate tracking of multiple objects.

Object tracker 560 may include an object tracking algorithm for tracking the movement of objects across adjacent or sequential frames in the video data stream from an initial position. For example, object tracker 560 may use initial bounding boxes and embeddings for an object of interest to track that object through subsequent frames by predicting likely positions and acceptable intersection over union (IOU) between adjacent frames. In some embodiments, object tracker 560 may integrate the functions of frame selector 556, object detector 542, and/or object detector threshold 558 into operation of object tracker 560 to process a target video data stream. Object tracker 560 may assign tracker identifiers 560.1 to each unique image object being track and be configured to track the position of each object, by tracker identifier, as they move into, around, and/or out of the video frame. Object tracker 560 may also determine tracker confidence values 560.2 for each object and its position information in each frame. In some embodiments, tracker confidence values may include IOU values between adjacent frames for the same object. Tracker identifiers 560.1 may be passed to bonding map manager 566 to store for the relevant frames in the bonding map for that video and ultimately determine, based on the bonding key, group identifiers for the frames.

In some embodiments, video group engine 554 may be configured with classifier trigger logic 562 to evaluate data generated by object tracker 560 to determine whether to selectively initiate group classifiers 550 when conditions are such that tracker identifiers may not be providing reliable information. When tracker conditions 562.1 are met, video group engine 554 may use tracker identifiers 560.1 to preserve the identity of an object across subsequent frames without invoking group classifiers 550. When tracker conditions 562.1 are not met, video group engine 554 may pass the frame data to group classifiers 550 to determine a classifier identifier for use in identifying that frame in the bonding map. In some embodiments, tracker conditions 562.1 may include an IOU threshold that is compared against the IOU value between adjacent frames from object tracker 560, another detector confidence threshold, and/or comparisons of position information. For example, tracker conditions 562.1 may include logic for evaluating relative size and position of bounding boxes across frames or among objects in the same frame to identify likely occlusions, crossings, partial objects, and other video object events that may reduce the reliability of object tracker 560. In some configurations, the IOU threshold or other tracker confidence value may be set high to avoid false positives. If the tracker conditions are met, video group engine 554 may proceed with using the bonding key as a lookup table to determine the group identifier and populate the bonding map. If the tracker conditions are not met, video group engine 554 may use the classifier identifier from group classifiers 550 to determine the group identifier for the bonding map.

Bonding key manager 564 may include logic for receiving and storing and/or accessing bonding keys generated by video calibration engine 590. For example, video calibration engine 590 may target a video data object and generate a bonding key assigned to a video identifier 564.1 for that video. When video group engine 554 is processing that video to assign groups to the frames, bonding key manager 564 may retrieve the bonding key for that video identifier. Each bonding key may include a set of tracker identifiers 564.2 for the video and corresponding group and/or classifier identifiers 564.2. Video group engine 554 may use the corresponding bonding key for a video as a lookup table indexed by tracker identifiers 564.2 for retrieving corresponding group and/or classifier identifiers 564.2. Bonding map manager 566 may be configured to generate and store bonding maps for videos being processed by video group engine 554. For example, bonding map manager 566 may store bonding map data 520.11 corresponding to each video processed and which may be used by image manager 530 for subsequent navigation and display of video data. Bonding map manager 566 may store a bonding map for each video processed and index them using a video identifier 520.12. Each bonding map may comprise a series of frame entries corresponding to the frames in the video data stream. Each frame entry may include a frame identifier 520.13 that identifies the frame in the sequence and/or timing of the video and records corresponding tracker identifiers 520.14, classifier identifiers 520.15, and/or group identifiers 520.16. In some embodiments, video group engine 554 may also include map postprocessor 568 configured to execute postprocessing logic for correcting a bonding map after all frames have been processed. For example, map postprocessor 568 may include logic for correcting null values in the classifier identifiers where a sequence of tracker identifiers indicates a different corresponding classifier identifier and group identifier.

Classifier calibration engine 570 may include an interface protocol and/or set of functions, parameters, and data structures for generating group classifiers 550. For example, classifier calibration engine 570 may determine the possible groups, select the groups qualifying for a group classifier, and train group classifiers 550 for deployment to support image manager 530 and ranking engine 554. In some embodiments, classifier calibration engine 570 may include a plurality of hardware and/or software modules configured to use processor 512 and memory 514 to handle or manage defined operations of calibration engine 570. For example, classifier calibration engine 570 may include a calibration set selector 572 configured to select the set of image data objects 520.2 from non-volatile memory 520 for calibration of group classifiers 550. Classifier calibration engine 570 may include a pre-detection filter 574 configured to reduce the set of image data objects 520.2 prior to object detection. Classifier calibration engine 570 may include an object detector 576 configured to detect objects of a selected object type in each image in the set of image data objects being processed. Classifier calibration engine 570 may include an object filter 578 configured to filter the images with detected objects prior to clustering. Classifier calibration engine 570 may include an image object manager 582 configured to store metadata related to detected objects for use by other functions, such grouping and validation. Classifier calibration engine 570 may include a clustering engine 584 configured to determine an initial set of clusters from the set of image data objects. Classifier calibration engine 570 may include a group selection engine 586 configured to select groups from among the initial groups that are significant enough to receive a dedicated group classifier. Classifier calibration engine 570 may include a group classifier generator 588 configured to generate and train group classifiers 550 based on the selected groups. Classifier calibration engine 570 may include re-clustering logic for determining and initiating recalibration of groups to update group classifiers 550 for changes in the image data and use. In some embodiments, calibration engine 570 returns group classifiers 550 for use by user device 500. Classifier calibration engine 570 may be supported by accessing and storing calibration data 520.20 in non-volatile memory 520.

Calibration set selector 572 may be configured to select the calibration set of image data objects 520.2 from image data 520.1 in non-volatile memory 520. For example, calibration set selector 572 may select all images of defined image file types from non-volatile memory 520. In some embodiments, calibration set selector 572 may use image index 520.4 curated by image manager 530 and/or calibration set selector 572 may perform its own scan of the data in non-volatile memory 520 to identify image data objects. Calibration set selector 572 may implement a pre-detection filter 574 configured to reduce the number of image data objects to be processed. As described above with regard to other filtering/selection operation, a variety of filtering criteria, such as image file type, size, quality, source, storage location, time, etc. may be used to filter the total set of image data objects 520.2 to a calibration data set.

Object detector 576 may operate substantially similar to object detector 542 to detect objects of a desired object type. In some embodiments, object detector 576 may use a different object detection algorithm than object detection algorithm 544. More specifically, because calibration may be done less frequently, timed for available processing resources, and/or offloaded to another system entirely (e.g., a storage server), a heavier weight object detection algorithm with greater processing and memory requirements than those of object detector 542 may be used in some embodiments. Object detector 576 may return detected objects for each image that contains one or more objects of the object type. Similar to object detector 542, object type, object position information, and an object confidence metric may be returned for each detected object in each image and store image objects 520.21 in calibration data 520.20. In some embodiments, object filter 578 may be applied to detected objects prior to processing the detected objects to determine their embeddings. For example, object filter 578 may apply a set of object filter criteria selected from object quality thresholds 578.1 (threshold values for quality metrics, such as size >40 pixels, position not adjacent edge, pitch/roll/yaw <25 degrees, occlusion, etc.) and selection constraints 578.2 (number of objects in the image, largest object in image, etc.). The filtered set of images/objects that pass object filter 578 may be stored as filtered objects 520.22 in calibration data 520.20. In some embodiments, image objects 520.21 and/or filtered objects 520.22 may be stored as cropped objects 520.23 comprised of the image data within the bounding box of the detected object.

Embedding model 580 may operate substantially similar to embedding model 546 in object detector 542. For example, object detector 576 and embedding model 580 may be based on a general population and predetermined standards for quantifying feature vectors. Embedding model 580 may process image objects 520.21, filtered objects 520.22, and/or cropped objects 520.23 to determine embedding values 520.24 for each object in the selected set of images/objects. In some embodiments, calibration engine 570 may include image object manager 582 for storing the metadata from detected objects in a more accessible form, such as within image metadata 520.4 associated with each image. For example, for detected objects 582.1, image object manager 582 may store metadata describing the detected objects in the metadata for the corresponding image. In some embodiments, object positioning information may be stored as object location 582.1.1, the confidence score from object detector 576 may be stored as object confidence score 582.1.2, and the embedding values from embedding model 580 may be stored as embeddings 582.1.2 in an object table, entry, or tag associated with the image metadata for the specific image data object. In some embodiments, the metadata describing the detected object may be appended to the image data object itself and stored with the image data in a storage location 582.2 in non-volatile memory 520.

Clustering engine 584 may be configured to process the set of images with detected objects of the object type determined by object detector 576 (as optionally filtered by object filter 578) in order to identify a plurality of initial groups 520.25. For example, a clustering algorithm 584.1 may be applied to the embeddings of the images containing detected objects and an initial group threshold 582.2 may be applied to a clustering parameter to determine sets of images containing similar sets of embeddings. In some embodiments, an unsupervised clustering method, such as DBSCAN, Chinese whispers, or another graph-based clustering algorithm and corresponding thresholds for identifying and ranking clusters, may be used. Each of the initial groups determined by clustering engine 584 may be treated as a possible group of interest containing the same object (e.g., individual human face) or group of objects (e.g., group of people in the same image). However, initial group clustering may identify clusters that are redundant (e.g., actually contain the same object in different groups), overbroad, and/or outlier subject matter unlikely to be of interest to the user. Generating and running image classifiers for every initial group may waste resources, add to clutter in image manager 530, and diminish the user experience.

Group selection engine 586 may be configured to determine, based on the initial groups 520.25, which groups should be used to generate group classifiers 550. For example, group selection engine 586 may include one or more rule sets for evaluating selection data 520.26, such as metadata related to the initial groups and/or the images and objects they contain, to determine their relevance for ongoing image classification. In some embodiments, for human face objects, face counts 586.1 may be used to determine unique individuals, groups, and unique individuals within groups to eliminate groups that appear inconsistent or redundant. Image metadata 586.2 may be compared against time, location, and other thresholds to eliminate groups that appear limited in their ongoing relevance to the user. A relationship algorithm 586.3, similar to the graph-based relationship ranking algorithms used by ranking engine 554, may be used to evaluate groups and relationships among groups. For example, similarity thresholds 586.4 may be applied to relationship ranks and/or other image metadata to determine that initial groups are too similar and may contain the same object. In some embodiments, user tags 586.5 may be available to assist in identifying groups as containing favorite and/or tagged objects to assist in the selection process. In some embodiments, group selection engine 586 may operate in conjunction with image manager 530 to enable users to assist in tagging and selecting images and corresponding groups for group classifiers 550. Group selection engine 586 may include group selection logic, such as an automated rules engine, for processing initial groups 520.25 and returning a selected subset of groups (e.g., selected groups 520.27) to use for generating group classifiers 550.

Group classifier generator 588 may include functions for automatically generating a plurality of group classifiers 550 corresponding to selected groups 520.27. For example, group classifier generator 588 may receive cluster identifiers and the corresponding set of objects/images in the cluster for selected groups 520.27. Group classifier generator 588 may assign a unique group identifier 588.1 to the group and the group classifier being generated. For example, a unique identification number or group name (such as a name from an identification tag associated with multiple images in the set) may be selected as unique group identifier 588.1. Group classifier generator 588 may select a classifier algorithm 588.2 for the group classifier (or for multiple group classifiers if a multigroup group classifier algorithm is selected). For example, all single group classifiers may be based on the same classifier algorithm 588.2 selected for the object type or a single multigroup group classifier may be based on a multigroup classifier algorithm for the object type.

Group classifier generator 588 may select a training data set 588.3 for the group classifier based on the images associated with the initial cluster by clustering engine 584 and stored as group training data 520.28. For example, training data set 588.3 may be the set of images in the cluster or a filtered subset thereof, using any of the filtering criteria used to filter images and objects elsewhere in calibration engine 570. For multigroup classifier algorithms, one classifier is trained for some or all of the selected groups using one training data set that includes all of the groups (such as a superset of the images corresponding to each group in a clustering analysis). Training of each group classifier may include training classifier algorithm 588.2 using corresponding group training data 520.28 to generate a set of group parameter data 520.29. Group parameter data 520.29 may include machine learning parameters generated through the training process for each group classifier, such as weighting values for neural network model. Group parameter data 520.29 may be associated with group identifier 588.1 (or multiple group identifiers) and classifier algorithm 588.2 to define a portable image classifier that can be deployed for use by image manager 530. In some embodiments, a verification engine 588.4 may be configured to evaluate the quality and reliability of an image group classifier before it is deployed. For example, verification engine 588.4 may receive a set of confidence metrics from the training process and compare them to a deployment threshold 586.5 for determining whether the group classifier is deployed. In some embodiments, a manual verification process may supplement verification engine 588.4 and allow a user to audit the group identifier and images in training data set 588.3 to determine whether they agree with the validity and relevance of the group classifier.

Classifier calibration engine 570 and/or image manager 530 may include re-clustering logic configured to determine whether and when calibration should be initiated to re-evaluate and/or retrain group classifiers 550. For example, re-clustering logic may determine and use a count of images captured or received after deployment of group classifiers 550 that are not classified into one or more groups. A re-clustering threshold may be based on a count threshold (absolute number, percentage of new images, percentage of total images, etc.) that triggers calibration engine 570 to repeat all or some of the calibration process. In some embodiments, a time-based threshold and/or user trigger may be used to trigger recalibration and re-clustering.

Video calibration engine 590 may include an interface protocol and/or set of functions, parameters, and data structures for generating bonding keys for use by video group engine 554. For example, video calibration engine 590 may process a sample set of video frames to determine the possible tracker identifiers and classifier identifiers and map correspondence between them for use in subsequent processing. In some embodiments, video calibration engine 590 may include a plurality of hardware and/or software modules configured to use processor 512 and memory 514 to handle or manage defined operations of video calibration engine 590. For example, video calibration engine 590 may include a calibration set selector 592 configured to select the calibration set of frames for a target video data object from non-volatile memory 520. Video calibration engine 590 may include frame processor interfaces 594 for using object detector 542, group classifiers 550, and object tracker 560 with high-levels of precision for generating the bonding key. Video calibration engine 590 may include bonding map logic 596 for generating a calibration bonding map for use in generating the bonding key. Video calibration engine 590 may include bonding key logic 598 configured to generate the bonding key from the calibration bonding map. Video calibration engine 590 may operate on video data objects 520.3 stored in non-volatile memory 520 and/or store video calibration data 520.30, calibration bonding map data 520.33, and/or bonding key data 520.37 in non-volatile memory 520.

In some embodiments, video calibration engine 590 may be selectively initiated for each video data object processed by video group engine 554. Video calibration engine 590 may generate an initial bonding key based on a calibration set of frames from the beginning (or first detected object) of the video data stream and pass the bonding key (and, in some cases, bonding map data) to video group engine 554 to continue building the bonding map for the video. In some embodiments, video calibration engine 590 may be dynamically triggered for additional calibration sets throughout the video data stream, such as based on new detected objects or tracker identifiers. For example, calibration set selector 592 may select the full calibration set of frames during a single calibration operation or calibration set selector may operate in parallel with video group engine 554 to determine additional subsets to add to the calibration set as new objects, tracker identifiers, or other events occur. In some configurations, video calibration engine 590 is a subfunction of video group engine 554 that is invoked for calibration operations as needed during video group processing.

Calibration set selector 592 may be configured to select the calibration set of frames for a target video data object 520.3 in non-volatile memory 520. For example, video calibration engine 590 may select a new video file from non-volatile memory 520 and calibration set selector 592 may select a subset of the total frames in the video data stream to use for a video calibration operation. In some embodiments, video calibration data 520.30 may include the target video data object designated by video identifier 520.31, such as a file name, storage location, object identifier, etc., and/or related video metadata, such as frame data 520.32 providing a sequential and/or time-based index of the frames in the video data stream. Calibration set selector 592 and the other functions of video calibration engine 590 may use video calibration data 520.30 to perform the video calibration operation. In some embodiments, calibration set selector 592 may include logic for determining what calibration set of frames are used. The calibration set of frames may be fewer frames than the entire set of frames in the video and, preferably, substantially fewer (less than 10%) to realize processing efficiencies.

In some embodiments, a fixed formula may be used for determining the calibration set of frames. For example, a fixed formula may define one or more blocks of frames selected from among the total stream, such as the first fifty frames, twenty frames selected every 30 seconds, etc., and may be embodied in fixed set parameters 592.1. In some embodiments, fixed set parameters 592.1 may be configurable and include values such as sample frame count, sample interval, etc. In some embodiments, the selection logic may be based on object tracker results. For example, object tracker 560 may be used to process the target video and tracker selection logic 592.2 may receive parameters from object tracker 560 for determining which frames to include in the calibration set. For example, tracker selection logic 592.2 may be configured for sampling a fixed number of frames each time a new tracker identifier is initiated and/or a new object is detected. Other tracker events, such as object exit, or tracker parameters, such as IOU, bounding box size, or position, may also be used to trigger selection of a block of frames adjacent the event. In some embodiments, the selection logic may be based on parameters of the calibration bonding map. For example, each time an object is detected and tracked by object tracker 560, group classifiers 550 may also process the corresponding frames to build the calibration bonding map as further discussed below. One or more correlation thresholds may be used to determine when the bonding map contains sufficient correlation data between tracker identifiers and classifier identifiers to generate a meaningful bonding key. For example, map threshold logic 592.3 may initialize a counter for each tracker identifier and time a tracker identifier correlates to a particular classifier identifier in a frame. The count of repeated correlations between the tracker identifier and a classifier identifier may be compared to a correlation threshold to determine when sufficient correlations have occurred to support a bonding key entry for that correlation. Once the correlation is added to the bonding key, additional calibration frames need not be selected for that tracker identifier (though calibration may continue to address additional tracker identifiers until all tracker identifiers have correlations meeting the threshold or another end condition is met).

During calibration operations, frame processor interfaces 594 may invoke object detector 542, group classifiers 550, and/or object tracker 560 with specific confidence or quality thresholds intended to enforce high reliability in the resulting bonding key. For example, frame processor interfaces 594 may receive object detection notifications from object detector 542 and may apply detector threshold 594.1 to determine whether the detector confidence parameters meet that threshold. Frame processor interface 594 may receive classifier identifiers and corresponding classifier confidence parameters from group classifiers 550 and apply classifier threshold 594.2 to determine whether the classifier confidence parameters meet the threshold. Frame processor interface 594 may receive tracker identifiers and corresponding tracker confidence parameters from object tracker 560 and apply tracker threshold 594.3 to determine whether the tracker confidence parameters meet the threshold. In some embodiments, bonding map logic 596 may use a combination of the correlations between tracker identifiers and classifier identifiers and whether or not those identifiers met the associated thresholds as part of voting function 596.1 for determining frame entries in the calibration bonding map.

Bonding map logic 596 may include logic for aggregating frame-by-frame data from object detector 542, group classifiers 550, and object tracker 560 for the calibration set of frames. For example, bonding map logic 596 may receive raw identifier and confidence data from the frame processor functions and aggregate it for each frame, then apply voting function 596.1 to determine whether any of the data represents a correlation with sufficient precision to be used. In some embodiments, bonding map logic 596 may store bonding map data 520.33 in non-volatile memory 520. For example, bonding map logic 596 may generate entries corresponding to correlations among frame identifiers 520.34, tracker identifiers 520.35, and classifier identifiers 520.36, and then refine those entries to reflect a best set of correlations for the calibration set of frames. Bonding map logic 596 may further include bond correction logic, such as classifier correction 596.2 and tracker correction 596.3 configured to use tracker identifier information and classifier identifier information across adjacent frames in the calibration set to correct outlier correlations. Bonding key logic 598 may include logic for processing calibration bonding map data 520.33 to reduce it to a bonding key that reflects a single entry for each tracker identifier. For example, bonding key logic 598 may determine each tracker identifier in bonding map data 520.33 with sufficient correlations to be regarded as accurate and determine the corresponding classifier identifier 520.39 and group identifier 520.40. In some embodiments, group identifiers 520.40 may match classifier identifiers 520.39 and the two may be used interchangeably in bonding key data 520.37. An example of bonding may logic 596 and bonding key logic 598 is described below with regard to FIGS. 6A-6D.

As shown in FIGS. 6A-6D, storage system 100 and/or user device 500 may generate and operate on bonding map data to generate a bonding key during a video calibration operation. FIG. 6E shows postprocessing of bonding map data for further corrections after an entire video data object has been processed.

Figure 6A:
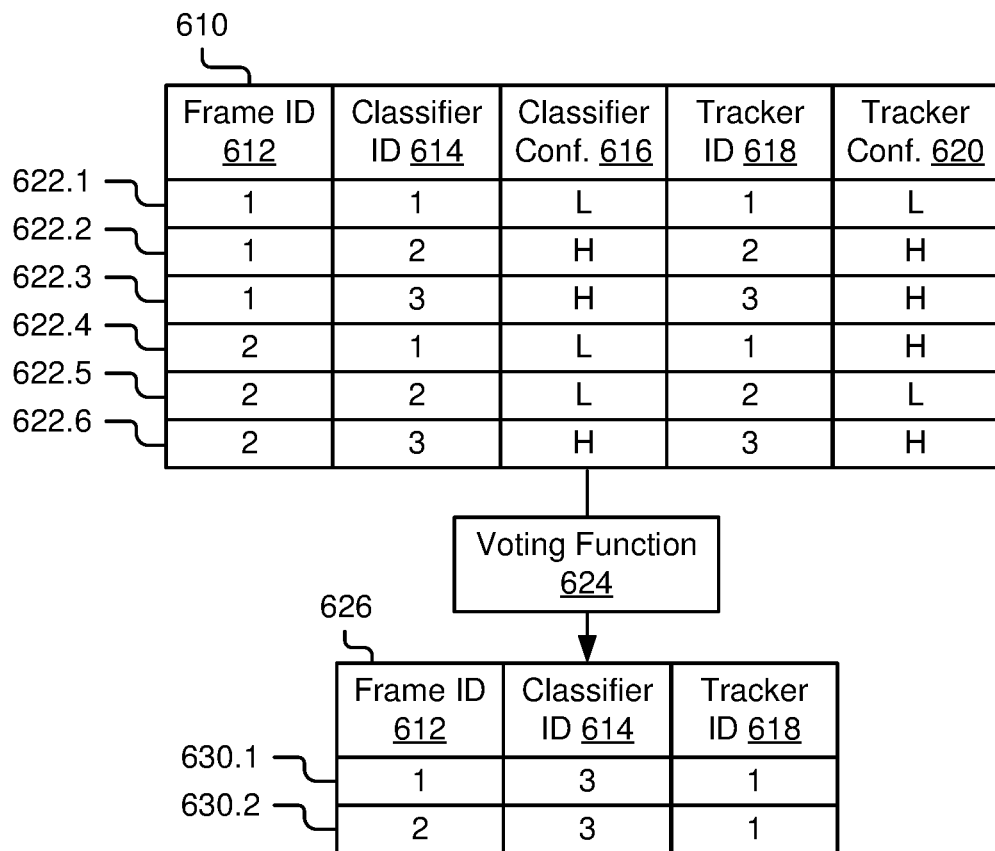
FIGS. 6A, 6B, 6C, 6D, and 6E schematically illustrate example generation and use of correlations between image group classifier identifiers and object tracker identifiers for video data processing.

In FIG. 6A, the bonding map logic may receive output values from the object tracker and the group classifier for each frame in the calibration set and populate an output table 610. Example output table 610 include a frame identifier column 612, a classifier identifier column 614, a classifier confidence column 616, a tracker identifier column 618, and a tracker confidence column 620. Each row 622.1-622.6 may include values for each column and describe a unique combination of frame identifier, classifier identifier, and tracker identifier. In some embodiments, position information corresponding to the classifier identifier and the tracker identifier may be used to assure that the two identifiers are referencing the same image object in the frame. Where multiple objects are in a frame, as in this example, there may be multiple rows, such as rows 622.1-622.3, with the same frame identifier. While FIG. 6A shows only the first six entries of output table 610, output table 610 may include entries for as many frames as are in the calibration set of frames.

In the example shown, each classifier identifier has a corresponding classifier confidence value and each tracker identifier has a tracker confidence value. The confidence values may correspond to whether or not the classifier identifier or tracker identifier meet their respective confidence or condition thresholds. For example, an H value in classifier confidence column 616 may indicate high confidence in the corresponding classifier identifier, such as the classifier confidence parameter for that classifier identifier meeting the classifier threshold of the video calibration engine. An L value in classifier confidence column 616 may indicate low confidence in the corresponding classifier identifier, such as the classifier confidence parameter not meeting the classifier threshold. Similarly, an H value in the tracker confidence column 620 may indicate high confidence based on the tracker threshold being met and an L value may indicate low confidence based on the tracker threshold not being met.

As discussed above, the confidence thresholds and confidence values may be used by voting function 624 to evaluate which correlations are strong enough to be included in the calibration bonding map entries 626. While the confidence conditions are summarized in a single value per identifier in the example shown, it should be understood that output table 610 and voting function 624 may use any number of confidence parameters and/or related conditions for determining whether a given identifier and/or correlation between identifiers is reliable. For example, output table parameters for classifier identifiers may include confidence parameters, embedding values (such as embedding values and ranges), position information, derived metrics, etc. and related classifier thresholds may include confidence thresholds, embedding values representing complete face landmarks, evaluations of size (e.g., pixel distance between eyes), rotation, or occlusion, bounding boxes denoting partial objects against an edge, etc. Output table parameters for tracker identifiers may include object detector confidence parameters, IOU values relative to adjacent frames, position information, detector events, etc. and related detector thresholds may include confidence thresholds, relative positions among bounding boxes in the frame, entrance events, exit events, crossing events, etc. Voting function 624 may process any combination of these criteria to determine which correlations generate entries. In the example shown, voting function 624 requires that both the classifier identifier and tracker identifier in the same frame have H confidence values (confidence thresholds met). As a result, calibration bonding map entries 626 include only entries 630.1 and 630.2 based on rows 622.1-622.6 in output table 610.

Figure 6B:
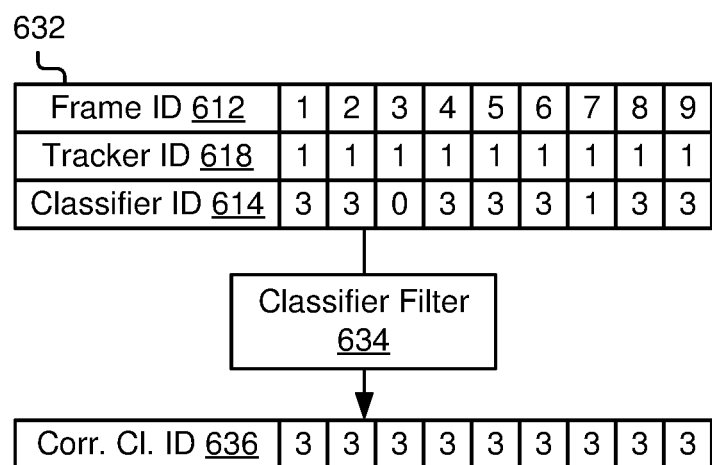

In FIG. 6B, entries from voting function 624 may be assembled in a calibration bonding map 632. Calibration bonding map 632 includes correlations among frame identifiers 612, tracker identifiers 618, and classifier identifiers 614, organized in frame order for the calibration set of frames. By assembling the entries in frame order, the bonding map logic may evaluate the correlations by their sequences or trends across frames and apply bond correction logic. The portion of bonding map 632 shown includes frames 1 thru 9.

The bonding map logic may include classifier filter 634. Classifier filter 634 may apply low pass filter logic to correct outlier classifier IDs that appear in continuous sequences of the same tracker identifier. In the example shown, seven of the nine classifier identifiers are 3 and the classifier identifiers for frames 3 and 7 are inconsistent with the surrounding values, despite the same tracker identifier (1) across all frames. Classifier filter 634 may modify the classifier identifiers for the inconsistent frames to corrected classifier identifiers 636 and store the corrected values in an updated calibration bonding map.

Figure 6C:
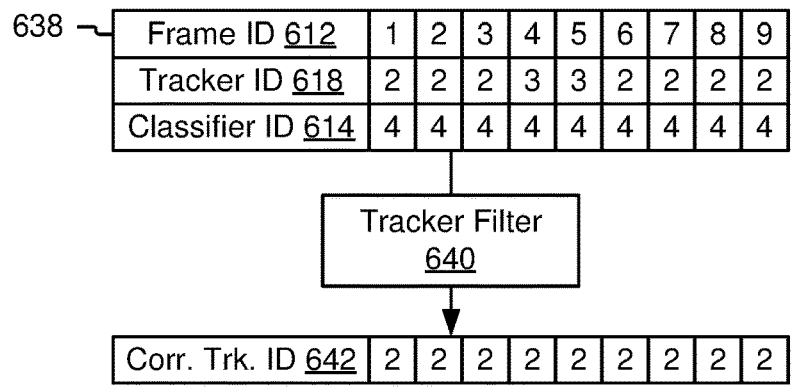

As shown in FIG. 6C, the bonding map logic may include tracker filter 640. Tracker filter 640 may determine inconsistencies in tracker identifier sequences associated with the same classifier identifier. In the example shown, seven of the nine tracker identifiers are 2 and the tracker identifiers for frames 4 and 5 are inconsistent with the other values in the sequence, despite the same classifier identifier (4) across all frames. Tracker filter 640 may modify the tracker identifiers for the inconsistent frames to corrected tracker identifiers 642 and store the corrected values in an updated calibration bonding map.

Figure 6D:
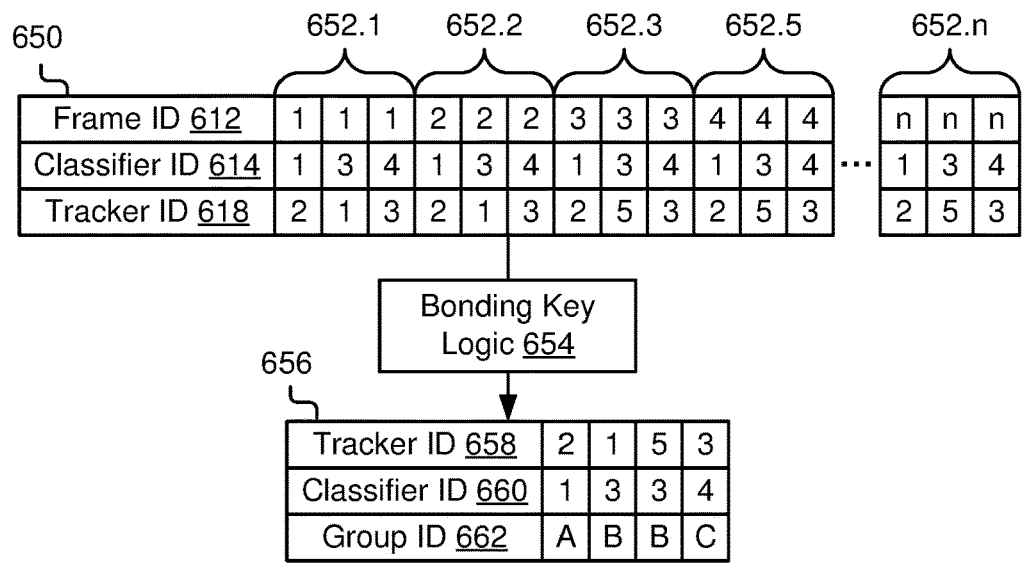
Figure 6E:
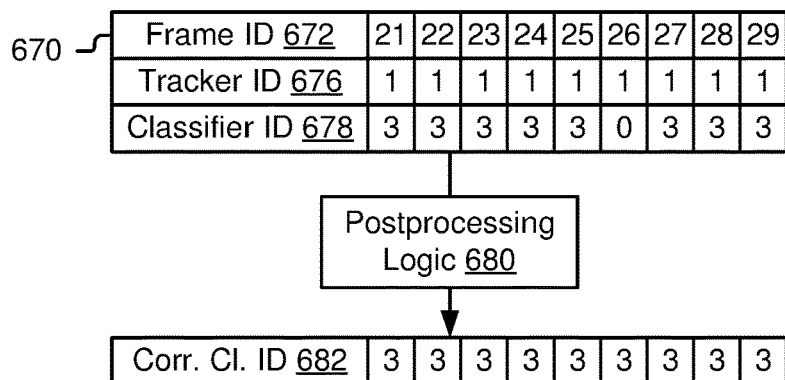

As shown in FIG. 6D, the bonding map logic may assemble a calibration bonding map 650 based on the processes described in FIGS. 6A-6C that includes entries for various combinations of frame identifier 612, classifier identifier 614, and tracker identifier 618 for the frames 652.1-652.n of the calibration set. In the example shown, multiple image objects are being tracked across each frame, resulting in multiple entries for each frame. Bonding key logic 654 may be configured to process calibration bonding map 650 to generate a bonding key 656 that summarizes the correlations from the calibration set of frames. Bonding key 656 may be indexed by tracker identifier 658, which may require that there is only one occurrence of each tracker identifier value in bonding key 656. However, multiple tracker identifiers may map to the same classifier identifier 660 and/or group identifier 662. There may be a one-to-one correlation between classifier identifiers and group identifiers, though the actual values of the two identifiers may vary in some configurations. For example, classifier identifiers 660 may be numerical identifiers sequentially generated and assigned to groups in the group classifiers and group identifiers 662 may be tags, such as group, object, or person names, that have been mapped to the classifier identifiers. Bonding key logic 654 may store the resulting bonding key 656 in metadata for the video data object or another location for use by the video group engine.

As shown in FIG. 6E, the video group engine may process additional frames from the video data object that were not part of the calibration set of frames to generate an initial bonding map 670 for the video. For example, the video group engine may process the entire video using the object tracker to determine tracker identifiers for each frame identifier 672 in the video data stream that includes objects of interest. Using the tracker identifier(s) 676 from each frame to index bonding key 656, the video group engine may determine corresponding classifier identifiers 678. In the example shown, the video group engine may be configured to only use bonding key 656 when tracker conditions are met and selectively invoke the group classifiers when the tracker conditions are not met. For example, at frame 26, the tracker identifier tracked an object corresponding to tracker identifier 1, but the tracker conditions were not met, the classifier identifier was not mapped from the bonding key, and the group classifiers were initiated. The group classifiers returned a 0 or null value for frame 26, meaning that, while an object of the type of interest was present, it could not be reliably classified into one of the known groups. In some embodiments, bonding map 670 may be stored as (a portion of) the final bonding map for the video data object.

In some embodiments, the video group engine may include postprocessing logic 680 configured to process the initial bonding map after it is completed for all frames of the video data object. For example, postprocessing logic 680 may include logic for correcting null values in the classifier identifiers that are inconsistent with a continuous sequence of tracker identifiers. In the example shown, the null value for classifier identifier 678 in frame 26 is inconsistent with the classifier identifiers determined by the tracker identifiers in the frames adjacent frame 26. Postprocessing logic 680 may evaluate the tracker identifier and classifier identifier values in the frames before and after the null value and determine that the null value should be corrected to the classifier identifier value from the bonding key. Postprocessing logic 680 may modify the classifier identifier value for frame 26 based on the bonding key and/or adjacent classifier identifier values and return corrected classifier identifiers 682. While postprocessing logic 680 may be described in terms of modifying the classifier identifier, it may also modify the corresponding group identifier for a final bonding map for the video data object.

Figure 7:
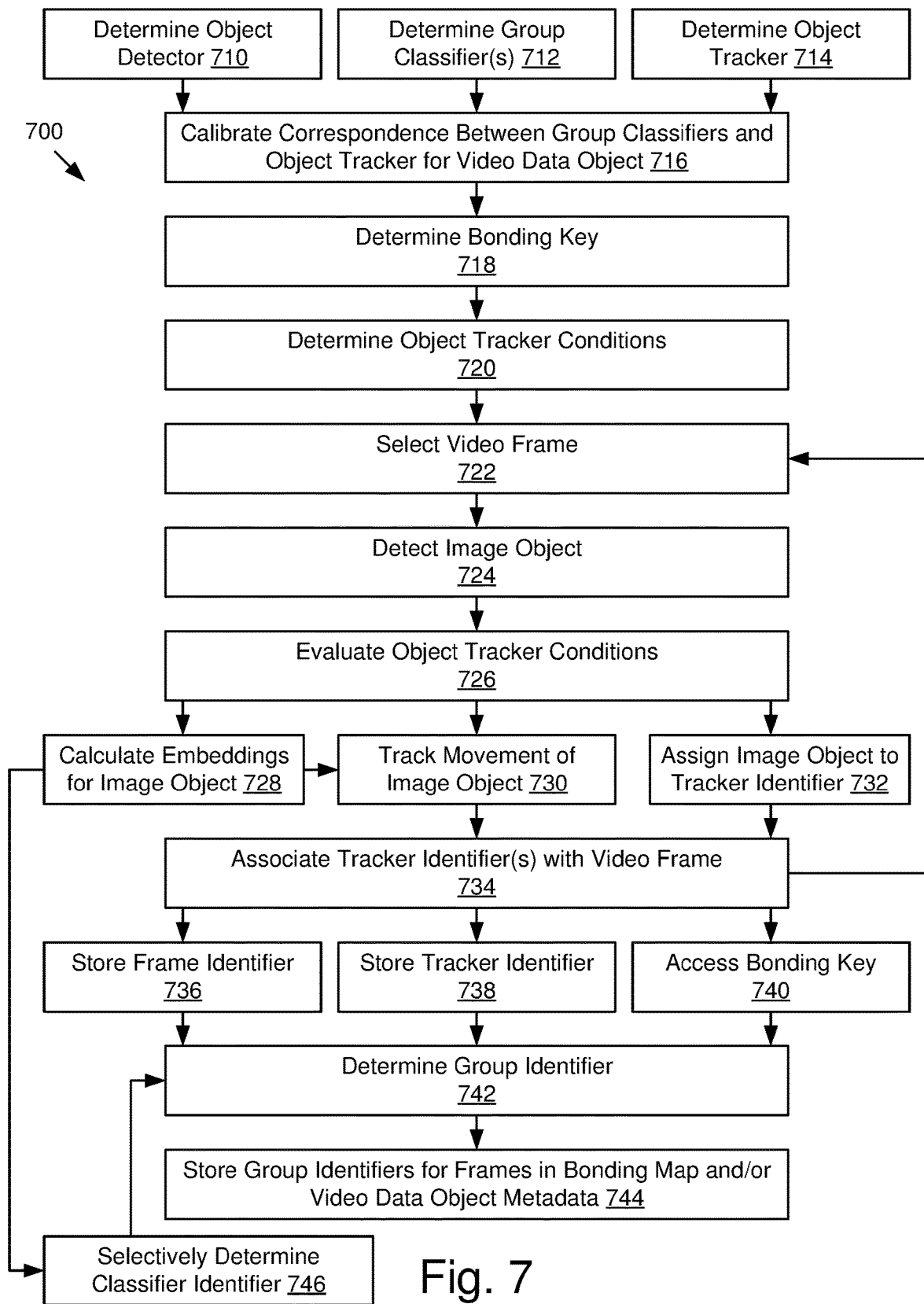
FIG. 7 is a flowchart of an example method of determining group identifiers for each frame of a video data object.

As shown in FIG. 7, storage system 100 and/or user device 500 may be operated according to an example method for determining group identifiers for each frame of a video data object, i.e., according to method 700 illustrated by blocks 710-746 in FIG. 7.

At block 710, an object detector may be determined. For example, a video or image processor may be configured with an object detector for detecting image objects of interest within the frames of a target video data object.

At block 712, at least one group classifier may be determined. For example, the video or image processor may be configured with group classifiers for classifying detected image objects into recognizable groups of interest.

At block 714, an object tracker may be determined. For example, the video or image processor may be configured with an object tracker for tracking the movement of detected image objects from frame-to-frame in a video data stream.

At block 716, correspondence between group classifiers and the object tracker may be calibrated for a target video data object. For example, a video calibration engine may process a calibration set of frames from the video to find correlations between classifier identifiers from the group classifiers and tracker identifiers from the object tracker.

At block 718, a bonding key may be determined. For example, the video calibration engine may return a bonding key containing correspondence information between tracker identifiers and classifier identifiers and/or group identifiers.

At block 720, object tracker conditions may be determined. For example, a video group engine may be configured with a set of object tracker conditions to evaluate the tracker confidence and other parameters for assuring that tracker identifiers returned by the object tracker are reliable for use in determining the classifier and/or group identifier using the bonding key.

At block 722, a video frame may be selected. For example, the object detector and/or object tracker may sequentially process the video frames in the video data stream.

At block 724, an image object may be detected. For example, the object detector may detect and initial occurrence of an object to initiate the object tracker or the object tracker may track a previously detected object into another frame.

At block 726, embeddings may be calculated for the image object. For example, the object detector and//or the object tracker may determine embeddings and position information for the detected (including tracked) image object in the current frame.

At block 728, object tracker conditions may be evaluated. For example, the video group engine may determine whether tracker conditions are met and the tracker identifier may be used for determining the classifier identifier or tracker conditions are not met and method 700 should continue to block 746.

At block 730, movement of the image object may be tracked. For example, the object detector may track the movement of a previously detected image object and maintain the associated tracker identifier.

At block 732, the image object may be assigned to a tracker identifier. For example, when an image object that is not presently being tracked is detected, the image object may be assigned to a corresponding tracker identifier.

At block 734, tracker identifiers may be associated with the video frame. For example, the tracker identifiers determined at block 730 or block 732 may be associated with the corresponding frame in the video data stream.

At block 736, a frame identifier may be stored in a bonding map. For example, the video group engine may generate and populate a bonding key map with entries for each frame with a detected object and each entry may include a frame identifier.

At block 738, a tracker identifier may be stored in the bonding map. For example, the tracker identifier from block 734 may be stored in the entry with the corresponding frame identifier.

At block 740, a bonding key may be accessed. For example, video group engine may access the bonding key determined at block 718 using the tracker identifier as an index value.

At block 742, a group identifier may be determined. For example, the video group engine may determine a classifier identifier corresponding to the tracker identifier from the bonding key and use it as the group identifier.

At block 744, the group identifier for the frame may be stored in the bonding map and/or metadata for the video data object. For example, the group identifier may be added to the corresponding entry in the bonding map and the bonding map may be used to populate a group identifier index for the frames of the video data object. The group identifier index may provide group-specific information for each frame or sequence of frames in the video data object that is used by an image manager for organizing, navigating, and displaying the video data.

At block 746, a classifier identifier may be selectively determined. For example, the group classifier may be used to classify the frame based on object tracker conditions not being met and the group classifier may be passed to block 742 for determining the group identifier for that frame.

Figure 8:
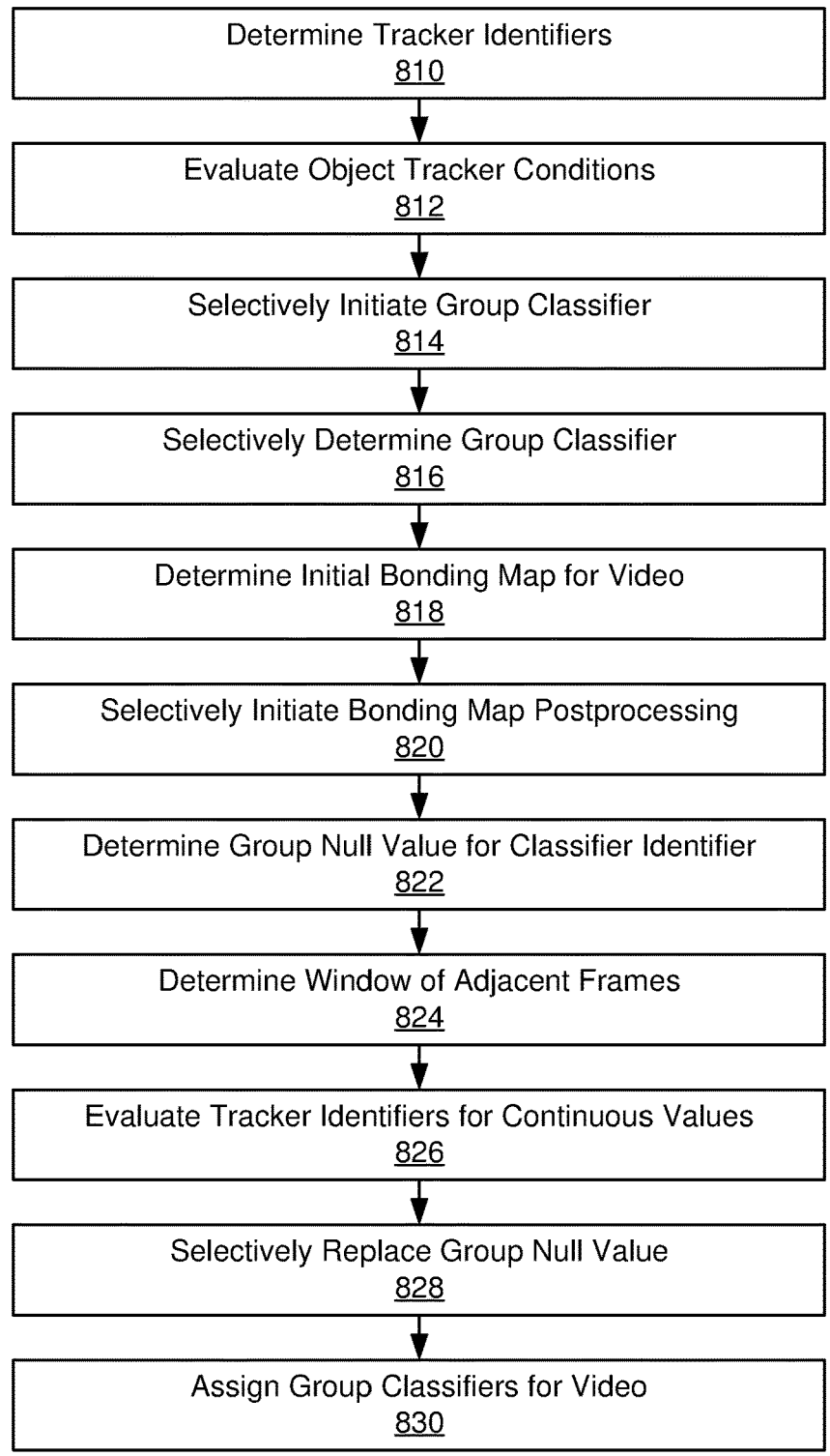
FIG. 8 is a flowchart of an example method of selectively using group classifiers when tracker conditions may not be reliable for one or more frames.

As shown in FIG. 8, storage system 100 and/or user device 500 may be operated according to an example method for selectively using group classifiers when tracker conditions may not be reliable for one or more frames, i.e., according to method 800 illustrated by blocks 810-830 in FIG. 8.

At block 810, tracker identifiers may be determined. For example, an object tracker operating as described above for method 700 may sequentially process frames from a target video data object.

At block 812, object tracker conditions may be evaluated. For example, the video group engine may compare one or more tracker confidence parameters for a tracker identifier and frame and determine that one or more tracker conditions are not met.

At block 814, a group classifier may be selectively initiated. For example, the video group engine may pass frames that have not met the tracker conditions to the group classifiers to process as image data objects.

At block 816, a group classifier may be selectively determined. For example, for the frames passed to the group classifiers, one or more classifier identifiers may be returned to the video group engine.

At block 818, an initial bonding map may be determined for the video. For example, all frames of the video may be processed using the object tracker and selectively initiating the group classifier as needed and the results for each frame may be stored in a bonding map.

At block 820, bonding map postprocessing may be selectively initiated. For example, the video group engine may be configured to enable or disable postprocessing and the postprocessing function may be selectively enabled.

At block 822, group or classifier null values may be determined based on classifier identifiers. For example, the bonding map may be searched for null values in the classifier identifiers and/or corresponding null group values in the group identifiers, based on classifier identifiers selectively determined at block 816.

At block 824, a window of adjacent frames may be determined. For example, map postprocessing logic may evaluate a defined window (number of frames) before and after the frame or frames with the null value.

At block 826, tracker identifiers may be continuous values. For example, the postprocessing logic may evaluate the tracker identifiers in the defined window to determine whether they all correspond to the same tracker identifier, suggesting continuous object tracking across the frame with the null value.

At block 828, group identifier null values may be selectively replaced. For example, if the postprocessing logic determines that the same tracker identifier appears throughout the window of frames, the classifier and/or group identifiers may be modified with the classifier and/or group identifiers from the adjacent frames and/or bonding key for the tracker identifier.

At block 830, the group classifiers from the bonding map may be assigned to the video frames. For example, the final bonding map modified by the postprocessing logic may be stored for in video metadata for use by the image manager.

Figure 9A:
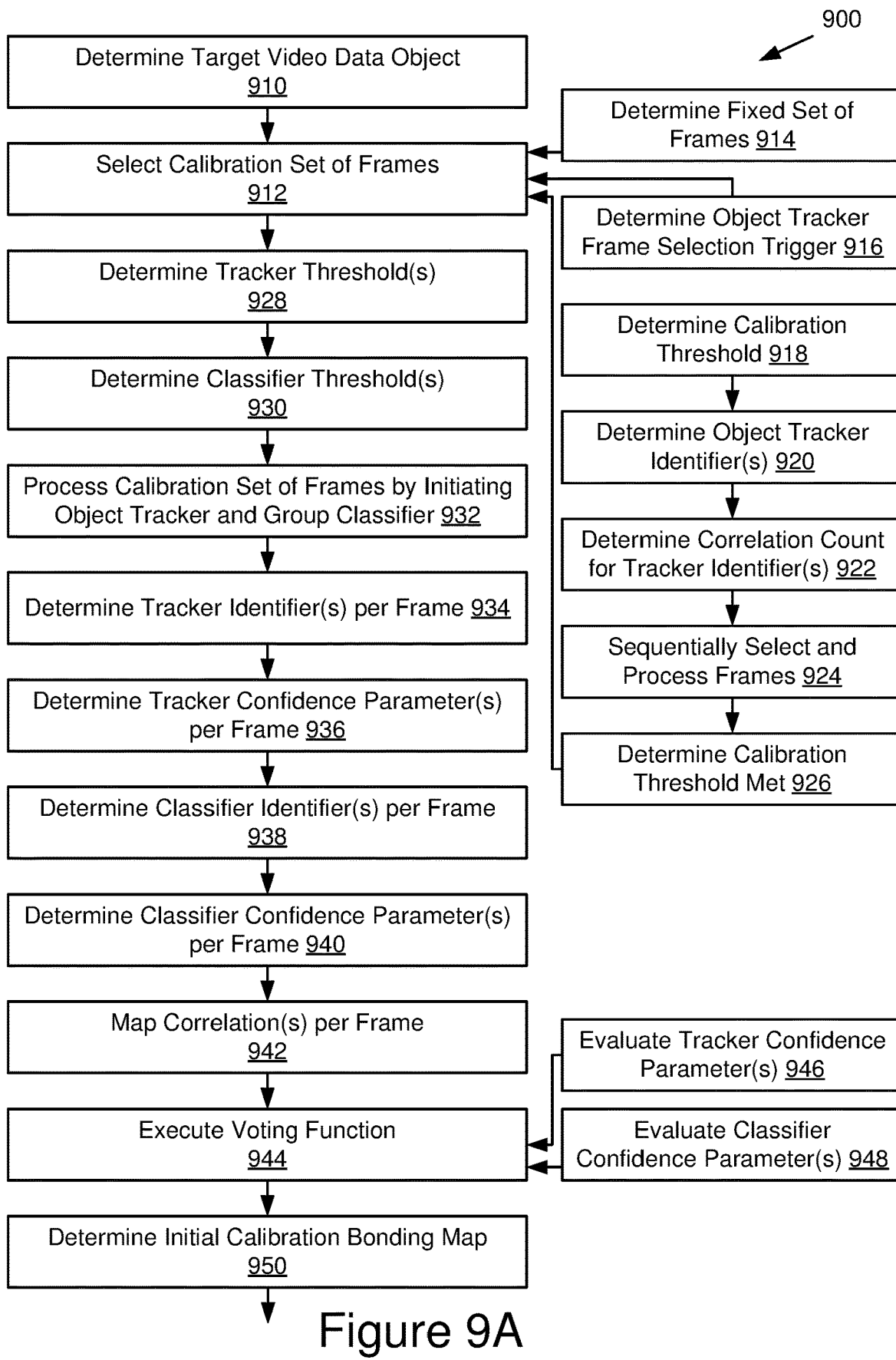
FIGS. 9A and 9B are a flowchart of an example method of calibrating the correlations between object tracker identifiers and group classifier identifiers for a video data object.
Figure 9B:
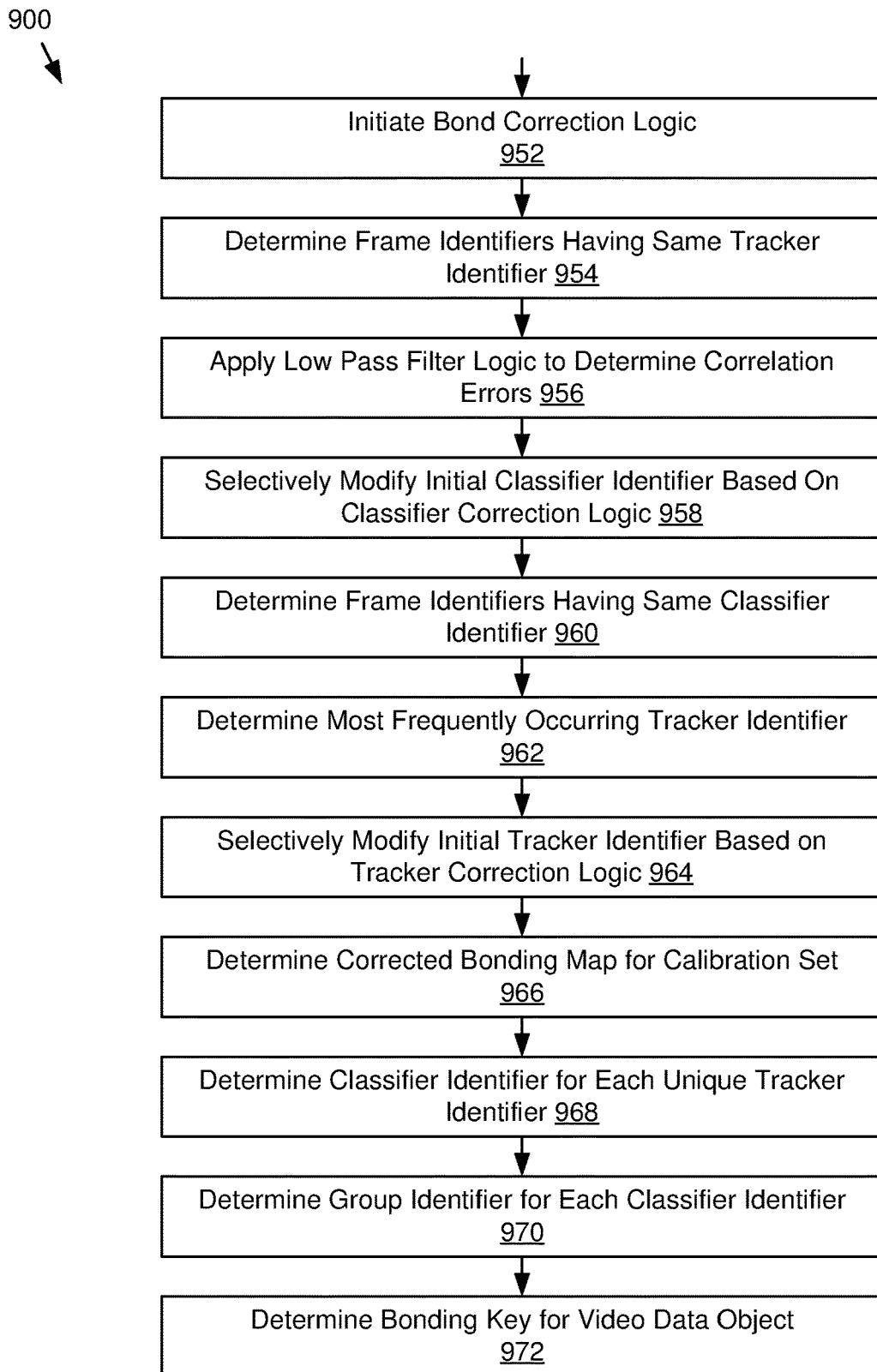

As shown in FIGS. 9A and 9B, storage system 100 and/or user device 500 may be operated according to an example method for calibrating the correlations between object tracker identifiers and group classifier identifiers for a video data object, i.e., according to method 900 illustrated by blocks 910-972 in FIGS. 9A and 9B.

At block 910, a target video data object may be determined. For example, an image manager may determine a new video file to be processed by a video group engine for determining groups within the video.

At block 912, a calibration set of frames may be determined. For example, a video calibration engine may select a set of frames from the target video that is less than all frames in the target video for the calibration process. Block 912 may be based on execution of some or all of blocks 914-926, depending on video calibration engine configuration.

At block 914, a fixed set of frames may be determined. For example, the video calibration engine may apply a formula to select a number of frames from the video, such as at the beginning of the video and/or at regular or random intervals throughout the video.

At block 916, frame selection may be determined using an object tracker trigger. For example, the video calibration engine may process the video through an object tracker (with or without a separate object detector) and may trigger selection of a number of frames each time a new tracker identifier is determined.

At block 918, a calibration threshold may be determined. For example, the video calibration engine may be configured with a calibration threshold value corresponding to a desired number of strong correlations between each tracker identifier and a corresponding classifier identifier.

At block 920, object tracker identifiers may be determined. For example, as the object detector process the video data stream each unique tracker identifier may be determined and occurrences counted for each frame in which the tracker identifier appears.

At block 922, a correlation count may be determined for each tracker identifier. For example, the video calibration engine may track each correlation between each tracker identifier and corresponding classifier identifiers during blocks 932-950.

At block 924, calibration frames are sequentially selected and processed. For example, from the first occurrence of a given tracker identifier, frames may be added to the calibration set and processed according to blocks 932-950.

At block 926, when the calibration threshold is met for tracker identifiers may be determined. For example, frames containing tracker identifiers that have not yet met the threshold may continue to be added to the calibration set and the correlation counts incremented until the calibration threshold is met by a correlation count for that tracker identifier, then that tracker identifier will no longer be a condition for selecting the frame for the calibration set. This process may continue until all tracker identifiers reach the calibration threshold, but only selecting frames for the calibration set that include at least one tracker identifier that has not yet met the calibration threshold.

At block 928, tracker thresholds may be determined. For example, the video group engine may be configured with one or more tracker thresholds for determining that the confidence or precision of the object tracker meets a high standard for accuracy.

At block 930, classifier thresholds may be determined. For example, the video group engine may be configured with one or more classifier thresholds for determining that the confidence or precision of the group classifiers meet high standards for accuracy.

At block 932, the calibration set of frames may be processed by initiating the object tracker and the group classifiers. For example, following the selection of the calibration set or as part of dynamically determining the calibration set (see blocks 916-926), the video calibration engine may initiate the object tracker to process sequential video frames and the group classifiers may be initiated to process the same sequential video frames (selected for the calibration set).

At block 934, tracker identifiers may be determined per frame. For example, the object tracker may process the frames and return one or more tracker identifiers corresponding to image objects being tracked through the frames.

At block 936, tracker confidence parameters may be determined per frame. For example, the object tracker may also return tracker confidence parameters for each tracker identifier returned for each frame.

At block 938, classifier identifiers may be determined per frame. For example, the group classifiers may process the frames and return one or more classifier identifiers corresponding to image objects detected in the frames.

At block 940, classifier confidence parameters may be determined per frame. For example, the group classifiers may also return classifier confidence parameters for each classifier identifier returned for each frame.

At block 942, correlations may be mapped per frame. For example, the output data from the object tracker and the group classifiers may be associated with the corresponding frame identifiers and related to each other using position information for their respective bounding boxes.

At block 944, a voting function may be executed. For example, the video calibration engine may process each corresponding combination of frame identifier, tracker identifier, and classifier identifier to determine the strongest correlations among them. In some embodiments, executing the voting function may be based on evaluating the confidence of the identifiers in blocks 946 and 948.

At block 946, tracker confidence parameters may be evaluated. For example, the voting function may include logical rules for evaluating tracker confidence parameters against one or more tracker conditions, such as comparing a tracker confidence value to a tracker confidence threshold, to determine whether a confidence threshold is met for the tracker identifier.

At block 948, classifier confidence parameters may be evaluated. For example, the voting function may include logical rules for evaluating classifier confidence parameters against one or more classifier conditions, such as comparing a classifier confidence value to a classifier confidence threshold, to determine whether a confidence threshold is met for the classifier identifier.

At block 950, an initial calibration bonding map may be determined. For example, based on the voting function, the video calibration engine may populate a bonding map with entries for correlations of tracker identifiers and classifier identifiers meeting the correlation criteria of the voting function and organized by their respective frame identifiers.

At block 952, bond correction logic may be initiated. For example, the video calibration engine may be configured with one or more bond correction functions that may be selectively applied to the initial calibration bonding map from block 950.

At block 954, frame identifiers having the same tracker identifier may be determined. For example, classifier correction logic may search the initial calibration bonding map for sequences of the same tracker identifier.

At block 956, low pass filter logic may be applied to determine correlation errors. For example, the classifier correction logic may process the corresponding sequence of classifier identifiers to identify outlier values that are not similar to neighbouring values.

At block 958, initial classifier identifiers may be selectively modified based on classifier correction logic. For example, the classifier correction logic may determine correction values for the outlier values based on the adjacent or dominant classifier identifier values on the sequence and apply those values to modify the classifier identifiers in the frames with outlier values.

At block 960, sequences of frame identifiers having the same classifier identifiers may be determined. For example, tracker correction logic may search the initial calibration bonding map for sequences of frames having the same classifier identifier.

At block 962, a most frequently occurring tracker identifier may be determined. For example, the tracker correction logic may count each tracker identifier appearing in the sequence.

At block 964, initial tracker identifiers may be modified based on the tracker correction logic. For example, the tracker correction logic may include a correction threshold for modifying tracker identifiers that are out of sequence with adjacent frames and/or fall below a desired number or ratio of occurrences and use adjacent tracker identifier values to modify the tracker identifiers with outlier values.

At block 966, a corrected bonding map may be determined for the calibration set. For example, the corrections determined at blocks 952-964 may be stored in an updated bonding map.

At block 968, a classifier identifier may be determined for each unique tracker identifier. For example, bonding key logic may determine the classifier identifier that appears most frequently across all frame identifiers for each tracker identifier such that each tracker identifier corresponds to a single classifier identifier.

At block 970, a group identifier may be determined for each classifier identifier. For example, the bonding key logic may map the classifier identifiers to group identifiers on a one-to-one basis.

At block 972, the bonding key may be determined for the video data object. For example, the video calibration engine may return the bonding key to the video group engine for processing remaining frames of the video data object.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. An end user device comprising:
   at least one processor;
   at least one memory;
   a storage medium configured to store user video data;
   an object tracker, stored in the at least one memory for execution by the at least one processor, configured to:
      determine a first image object in a first frame of a video data stream from the user video data;
      assign, to the first image object in the first frame, a first tracker identifier;
      process subsequent frames of the video data stream to track movement of the first image object; and
      associate each frame of the video data stream corresponding to the movement of the first image object with the first tracker identifier; and
   a video group engine, stored in the at least one memory for execution by the at least one processor, configured to:
      determine, using a group classifier and a target frame assigned the first tracking identifier, a first group identifier associated with the first image object to generate a bonding key configured to map the first tracker identifier to the first group identifier;
      assign, based on the first tracker identifier and the bonding key, the first group identifier to a first plurality of frames of the video data stream, wherein:
         the first plurality of frames of the video data stream are not processed by the group classifier;
         the first group identifier corresponds to a first classifier identifier from the group classifier; and
         the group classifier is trained using machine learning to determine at least one classifier identifier, including the first classifier identifier.

2. The end user device of claim 1, further comprising:
   a face detector, stored in the at least one memory for execution by the at least one processor, configured to:
      process each frame of the video data stream to detect at least one human face; and
      calculate, for the at least one human face, embeddings quantifying a plurality of features of the at least one human face, wherein detection of the at least one human face by the face detector initiates the object tracker.

3. The end user device of claim 1, further comprising:
   a bonding map, stored in the at least one memory, comprising:
      a plurality of frame identifiers corresponding to a plurality of frames in the video data stream; and
      a plurality of group identifiers, including the first group identifier, associated with at least one frame identifier of the plurality of frame identifiers, wherein the plurality of group identifiers is assigned to the plurality of frame identifiers based on a plurality of tracker identifiers from the object tracker.

4. The end user device of claim 3, wherein the video group engine is further configured to:
   process the plurality of frames using the object tracker to determine the plurality of frame identifiers; and
   for each frame identifier and corresponding tracker identifier:
      store, in the bonding map, that frame identifier;
      determine a group identifier from the plurality of group identifiers that corresponds to that corresponding tracker identifier; and
      store, in the bonding map, the determined group identifier associated with that frame identifier.

5. The end user device of claim 4, wherein:
the bonding key is further configured to map the plurality of tracker identifiers to the plurality of group identifiers; and
determining the group identifier for each corresponding tracker identifier includes using that corresponding tracker identifier to index the corresponding group identifier in the bonding key.

6. The end user device of claim 4, wherein the video group engine is further configured to:
determine tracker conditions for initiating the group classifier for a target frame of the plurality of frames;
determine, using the group classifier, a group null value corresponding to a detected image object not meeting a classification threshold for groups in the group classifier;
evaluate, in the bonding map and following processing the plurality of frames to generate the bonding map, tracker identifiers for frame identifiers of adjacent frames to determine a continuous set of a same tracker identifier value; and
assign, to the frame identifier for the target frame, a corresponding group classifier for the same tracker identifier value.

7. The end user device of claim 1, further comprising:
the group classifier, stored in the at least one memory for execution by the at least one processor, configured to:
determine embeddings for at least one image object in the target frame from a calibration set of frames from the video data stream;
process the embeddings for the at least one image object through at least one set of machine learning parameters, wherein each set of the at least one set of machine learning parameters is assigned to a different classifier identifier; and
determine, based on processing the embeddings for the at least one image object, the first classifier identifier for the at least one image object; and
a video calibration engine, stored in the at least one memory for execution by the at least one processor, configured to:
determine the calibration set of frames from the video data stream, wherein the calibration set of frames includes fewer frames than all frames in the video data stream;
for each frame in the calibration set of frames:
select a corresponding target frame from the training set of frames;
initiate the object tracker to process the corresponding target frame to generate at least one tracker identifier for the corresponding target frame; and
initiate the group classifier to process the corresponding target frame to generate at least one classifier identifier for the corresponding target frame; and
determine at least one correlation between the at least one tracker identifier and the at least one classifier identifier, wherein generating the bonding key is based on the at least one correlation.

8. The end user device of claim 7, wherein:
the object tracker is further configured to determine at least one tracker confidence parameter for the at least one tracker identifier corresponding to the corresponding target frame;
the group classifier is further configured to determine at least one classifier confidence parameter for the first classifier identifier corresponding to the corresponding target frame; and
the video calibration engine is further configured to:
determine at least one tracker threshold;
determine at least one classifier threshold;
map, for each corresponding target frame, the at least one tracker identifier to the at least one classifier identifier; and
execute a voting function to determine a set of valid correlations between the at least one tracker identifier and the at least one classifier identifier to determine the at least one correlation, wherein the voting function is based on:
evaluating the at least one tracker confidence parameter based on the at least one tracker threshold; and
evaluating the at least one classifier confidence parameter based on the at least one classifier threshold.

9. The end user device of claim 7, wherein the video calibration engine is further configured to determine the calibration set of frames from the video data stream by:
determining a calibration threshold of a number of frames with correlations between the at least one tracker identifier and the at least one classifier identifier;
determining, using the object tracker, at least one unique tracker identifier in the video data stream; and
sequentially selecting, until the calibration threshold is reached for each unique tracker identifier of the at least one unique tracker identifier, frames from the video data stream to include in the calibration set of frames.

10. The end user device of claim 7, wherein the video calibration engine is further configured to:
determine, for each frame in the calibration set of frames, at least one initial tracker identifier;
determine, for each frame in the calibration set of frames, at least one initial classifier identifier;
modify, for selected frames and to determine the at least one correlation, at least one of:
the at least one initial tracker identifier responsive to tracker correction logic; and
the at least one initial classifier identifier responsive to classifier correction logic; and
generate, based on the at least one correlation, the bonding key comprising a plurality of different tracker identifiers from the calibration set of frames and corresponding group identifiers.

11. A computer-implemented method, comprising:
determining, by an end user device using an object tracker, a first image object in a first frame of a video data stream from user video data;
assigning, by the object tracker and to the first image object in the first frame, a first tracker identifier;
processing, by the object tracker, subsequent frames of the video data stream to track movement of the first image object;
associating, by the object tracker, each frame of the video data stream corresponding to the movement of the first image object with the first tracker identifier;
determining, using a group classifier and a target frame assigned the first tracking identifier, a first group identifier associated with the first image object to generate a bonding key configured to map the first tracker identifier to the first group identifier;

assigning, by the end user device and based on the first tracker identifier and the bonding key, the first group identifier to a first plurality of frames of the video data stream, wherein:
the first plurality of frames of the video data stream are not processed by the group classifier;
the first group identifier corresponds to a first classifier identifier from the group classifier; and
the group classifier is trained using machine learning to determine at least one classifier identifier, including the first classifier identifier.

12. The computer-implemented method of claim 11, further comprising:
processing each frame of the video data stream to detect at least one human face; and
calculating, for the at least one human face, embeddings quantifying a plurality of features of the at least one human face, wherein detection of the at least one human face initiates the object tracker.

13. The computer-implemented method of claim 11, further comprising:
determining a plurality of frame identifiers for a plurality of frames in the video data stream;
processing the plurality of frames using the object tracker to determine a plurality of tracker identifiers; and
for each frame identifier and corresponding tracker identifier:
storing, in a bonding map, that frame identifier;
determining, from a plurality of group identifiers, the group identifier that corresponds to that corresponding tracker identifier; and
storing, in the bonding map, the determined group identifier associated with that frame identifier.

14. The computer-implemented method of claim 13, wherein:
the bonding key is further configured to map the plurality of tracker identifiers to the plurality of group identifiers; and
determining the group identifier for each corresponding tracker identifier includes using that corresponding tracker identifier to index the corresponding group identifier in the bonding key.

15. The computer-implemented method of claim 13, further comprising:
determining tracker conditions for initiating the group classifier for a target frame of the plurality of frames;
determine, from the group classifier, a group null value corresponding to a detected image object not meeting a classification threshold for groups in the group classifier;
evaluating, in the bonding map and following processing the plurality of frames to generate the bonding map, tracker identifiers for frame identifiers of adjacent frames to determine a continuous set of a same tracker identifier value; and
assigning, to the frame identifier for the target frame, a corresponding group classifier for the same tracker identifier value.

16. The computer-implemented method of claim 11, further comprising, during a calibration process:
determining a calibration set of frames from the video data stream, wherein the calibration set of frames includes fewer frames than all frames in the video data stream;
for each frame in the calibration set of frames:
selecting a corresponding target frame from the calibration set of frames;
determining embeddings for at least one image object in the corresponding target frame;
initiating the object tracker to process the corresponding target frame to generate at least one tracker identifier for the corresponding target frame; and
initiating the group classifier to process the corresponding target frame to generate at least one classifier identifier for the corresponding target frame, wherein the group classifier is configured to:
process the embeddings for the at least one image object through at least one set of machine learning parameters; and
determine, based on processing the embeddings for the at least one image object, at least one category identifier for the at least one image object; and
determining at least one correlation between the at least one tracker identifier and the at least one classifier identifier, wherein generating the bonding key is based on the at least one correlation.

17. The computer-implemented method of claim 16, further comprising:
determining at least one tracker threshold;
determining at least one classifier threshold;
determining, by the object tracker, at least one tracker confidence parameter for the at least one tracker identifier corresponding to the corresponding target frame;
determining, by the group classifier, at least one classifier confidence parameter for the first classifier identifier corresponding to the corresponding target frame;
mapping, for each corresponding target frame, the at least one tracker identifier to the at least one classifier identifier; and
executing a voting function to determine a set of valid correlations between the at least one tracker identifier and the at least one classifier identifier to determine the at least one correlation, wherein the voting function is based on:
evaluating the at least one tracker confidence parameter based on the at least one tracker threshold; and
evaluating the at least one classifier confidence parameter based on the at least one classifier threshold.

18. The computer-implemented method of claim 16, wherein determining the calibration set of frames from the video data stream comprises:
determining a calibration threshold of a number of frames with correlations between the at least one tracker identifier and the at least one classifier identifier;
determining, using the object tracker, at least one unique tracker identifier in the video data stream; and
sequentially selecting, until the calibration threshold is reached for each unique tracker identifier of the at least one unique tracker identifier, frames from the video data stream to include in the calibration set of frames.

19. The computer-implemented method of claim 18, further comprising:
determining, for each frame in the calibration set of frames, at least one initial tracker identifier;
determining, for each frame in the calibration set of frames, at least one initial classifier identifier;
modifying, for selected frames and to determine the at least one correlation, at least one of:
the at least one initial tracker identifier responsive to tracker correction logic; and
the at least one initial classifier identifier responsive to classifier correction logic; and generating, based on the at least one correlation, the bonding key comprising a plurality of different tracker identifiers from the training set of frames and corresponding group identifiers.

20. An end user computing device, comprising:
at least one processor;
at least one memory;
a storage medium configured to store user video data;
means for determining, using an object tracker, a first image object in a first frame of a video data stream from the user video data;
means for assigning, by the object tracker and to the first image object in the first frame, a first tracker identifier;
means for processing, by the object tracker, subsequent frames of the video data stream to track movement of the first image object;
means for associating, by the object tracker, each frame of the video data stream corresponding to the movement of the first image object with the first tracker identifier;
means for determining, using a group classifier and a target frame assigned the first tracking identifier, a first group identifier associated with the first image object to generate a bonding key configured to map the first tracker identifier to the first group identifier;
means for assigning, based on the first tracker identifier and the bonding key, the first group identifier to a first plurality of frames of the video data stream, wherein:
the first plurality of frames of the video data stream are not processed by the group classifier;
the first group identifier corresponds to a first classifier identifier from the group classifier; and
the group classifier is trained using machine learning to determine at least one classifier identifier, including the first classifier identifier.

* * * * *